(12) United States Patent
Khajeh et al.

(10) Patent No.: US 11,392,250 B1
(45) Date of Patent: Jul. 19, 2022

(54) ULTRASONIC TOUCH SENSING PARASITIC WAVE REJECTION

(71) Applicant: Apple Inc., Cupertino, CA (US)

(72) Inventors: Ehsan Khajeh, Los Gatos, CA (US); George Ho Yin Mak, Santa Clara, CA (US); Brian Michael King, Saratoga, CA (US); Karan Jain, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/139,598

(22) Filed: Dec. 31, 2020

(51) Int. Cl.
*G06F 3/041* (2006.01)
*G06F 3/043* (2006.01)

(52) U.S. Cl.
CPC ........ *G06F 3/0436* (2013.01); *G06F 3/04144* (2019.05)

(58) Field of Classification Search
CPC .......................... G06F 3/0436; G06F 3/04144
See application file for complete search history.

(56) References Cited

U.S. PATENT DOCUMENTS

| | | |
|---|---|---|
| 2011/0234545 A1 | 9/2011 | Tanaka et al. |
| 2013/0154930 A1 | 6/2013 | Xiang et al. |
| 2014/0118307 A1* | 5/2014 | Berget ............... H03H 9/02535 345/177 |
| 2015/0181338 A1 | 6/2015 | Hosoi et al. |
| 2015/0277610 A1* | 10/2015 | Kim ......................... G06F 3/016 345/173 |
| 2016/0085298 A1 | 3/2016 | Kristensson et al. |
| 2017/0235434 A1* | 8/2017 | Qutub ................... G06F 3/0436 345/177 |
| 2017/0255338 A1* | 9/2017 | Medina ..................... G01L 1/16 |
| 2018/0032211 A1* | 2/2018 | King ..................... G06F 1/3231 |
| 2018/0210598 A1* | 7/2018 | Lu ........................... G06F 3/016 |
| 2018/0284946 A1* | 10/2018 | Yousefpor ........... G06F 3/03545 |
| 2018/0341347 A1 | 11/2018 | Yousefpor et al. |
| 2018/0341359 A1 | 11/2018 | Khajeh et al. |

* cited by examiner

*Primary Examiner* — Towfiq Elahi
(74) *Attorney, Agent, or Firm* — Kubota & Basol LLP

(57) ABSTRACT

Improving the accuracy of ultrasonic touch sensing via the reduction, elimination and/or rejection of parasitic ultrasonic reflections caused by unintended touches is disclosed. The adverse effects of these parasitic reflections can be mitigated by disrupting the symmetry of the true reflections (from the intended touch) and the parasitic reflections (from unintended touches) so that the true touch can be disambiguated from unintended touches. Identification of the true touch can then enable accurate touch localization.

22 Claims, 20 Drawing Sheets

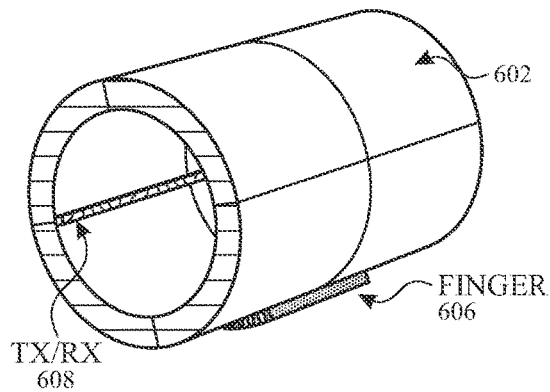
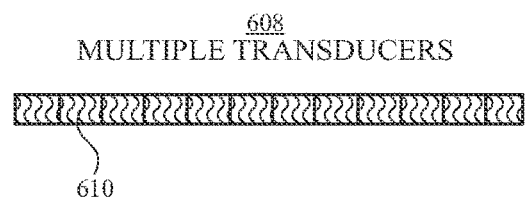
FIG. 6A
FIG. 6B
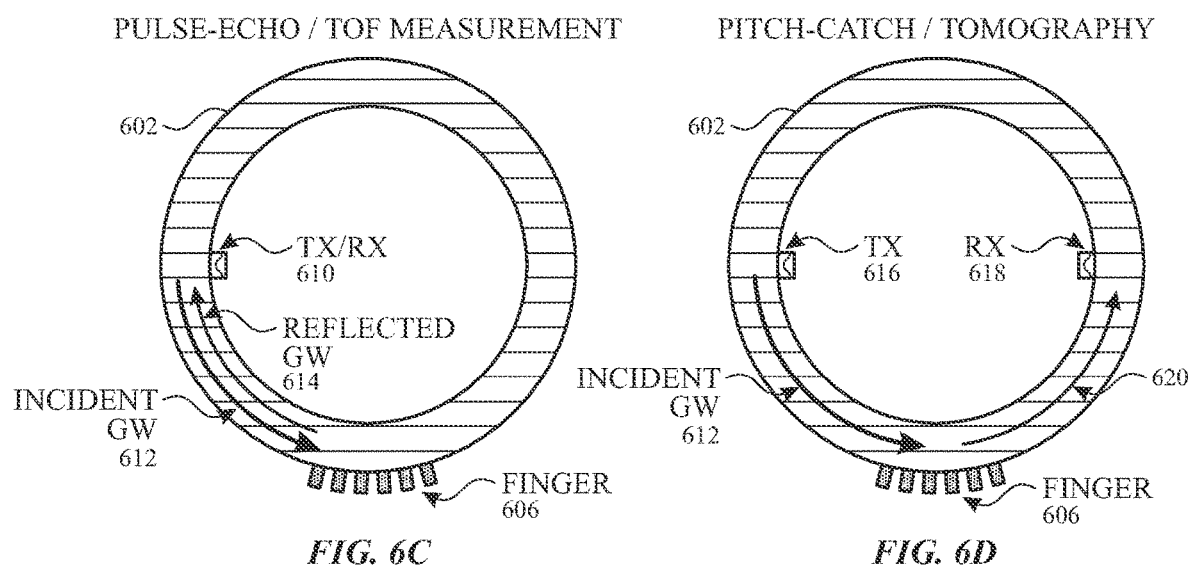
FIG. 6C
FIG. 6D

ULTRASONIC TOUCH SENSING PARASITIC WAVE REJECTION

FIELD OF THE DISCLOSURE

This relates generally to ultrasonic touch sensing systems, and more particularly, to the rejection of parasitic waves caused by objects making inadvertent contact with a touch surface of an ultrasonic touch sensing system.

BACKGROUND OF THE DISCLOSURE

Many types of electronic devices are presently available that are capable of receiving touch input to initiate operations. Examples of such devices include desktop, laptop and tablet computing devices, smartphones, media players, wearables such as watches and health monitoring devices, smart home control and entertainment devices, headphones and earbuds, and devices for computer-generated environments such as augmented reality, mixed reality, or virtual reality environments. Many of these devices can receive input through the physical touching of buttons or keys, mice, trackballs, joysticks, touch panels, touch screens and the like. Capacitive touch sensing, in particular, has become popular. With capacitive touch sensing, a user can perform various functions by touching a capacitive touch sensing array using a finger, stylus or other object at a particular location or locations. A computing system can recognize the touch and the position of the touch within the capacitive touch sensing array, and thereafter perform one or more actions based on the touch. However, the conductive electrodes of capacitive touch sensing systems can interfere with the performance of nearby electronics such as antennas or other systems that are adversely affected by the presence of conductive material. In addition, capacitive touch sensing systems can experience sensing errors or reduced performance when conductive, electrically-floating liquids (e.g., water droplets) or insulated objects (e.g., gloved fingers) come into contact with its touch-sensitive surface. This can be particularly problematic for devices that are intended for outdoor use, exercise, and other situations where bodies of water, rain, or perspiration may be present, or for devices that are intended for use in cold weather, where gloved fingers are to be expected.

SUMMARY

Examples of the disclosure are generally directed to providing ultrasonic touch sensing capability. In some examples, this ultrasonic touch sensing capability can be integrated into existing device structures to facilitate user input without adding extra structure. Unlike capacitive touch sensing systems, in some ultrasonic touch sensing systems the transducers/electrodes can be implemented far from touch areas, and long-range touch sensing can be achieved (e.g., sonar). Accordingly, when electronics such as antennas are co-located with active touch areas, these ultrasonic systems are less likely to adversely affect those electronics. In addition, ultrasonic touch sensing systems can be less affected when conductive, electrically-floating liquids (e.g., water droplets) or insulated objects (e.g., gloved fingers) come into contact with its touch-sensitive surface.

Ultrasonic touch sensing systems, like other touch sensing systems, can be adversely affected when an object unintentionally makes contact with the touch-sensitive surface, either alone or at the same time as an intended touch. In ultrasonic touch sensing systems, these unintentional contacts can produce reflections of a generated ultrasonic wave, referred to herein as "parasitic" ultrasonic waves or reflections. When an unintended touch occurs alone (without a simultaneously occurring intended touch), the parasitic reflection caused by the unintended touch can be erroneously interpreted as indicative of an intended, valid touch. When an unintended touch occurs at the same time as an intended touch, the ultrasonic transducers may be unable to distinguish the parasitic reflections from "true" reflections caused by an intended touch (due to the rough "symmetry" of the true and parasitic reflections), and the parasitic reflections can corrupt the proper detection of the valid touch.

Accordingly, some examples of the disclosure are directed to improving the accuracy of ultrasonic touch sensing via the reduction, elimination and/or rejection of parasitic ultrasonic reflections. Fundamentally, the adverse effects of these parasitic reflections can be mitigated by disrupting the symmetry of the true reflections (from the intended touch) and the parasitic reflections (from the unintended touch). In one example, an absorbent material can be placed in a location where unintended object touches (e.g., from an ear or cheek) are expected, so that ultrasonic waves propagated in the direction of the unintended touching object are absorbed by the absorbent material, resulting in significant attenuation of the amplitude of the parasitic reflection as compared to the true reflection from an intended touch (e.g., from a finger). This attenuation of the parasitic wave can disrupt the symmetry of the amplitude of the parasitic and true reflections, which can allow for rejection of the parasitic reflection and processing of the true reflection. In another example, the ultrasonic transducer can be placed in an area where unintended object touches are expected, so that parasitic reflections can be received at the transducer much earlier than true reflections from an intended touch. This time separation of the parasitic wave from the true wave can disrupt the symmetry of the parasitic and true reflections, which can allow for rejection of the parasitic reflection and processing of the true reflection. In yet another example, a multi-element phased array of ultrasonic transducers can be employed to selectively direct ultrasonic waves in different directions at different times. For example, the phased array can first direct ultrasonic waves towards an area where unintended object touches are expected, and then direct ultrasonic waves towards an area where intended touches are expected. The time separation of the directional ultrasonic waves can cause true reflections from an intended touch, and parasitic reflections from an unintended touch, to be received back at the transducer at different times. This time separation of the parasitic wave from the true wave disrupts the symmetry of the parasitic and true reflections, which can allow for rejection of the parasitic reflection and processing of the true reflection.

BRIEF DESCRIPTION OF THE DRAWINGS

FIG. 6A illustrates a cylinder with circumferential ultrasonic touch sensing according to examples of the disclosure.

FIG. 6B illustrates a one-dimensional multi-pixel array of ultrasonic transducers for circumferential ultrasonic touch sensing according to examples of the disclosure.

FIG. 6C illustrates an ultrasonic transducer operating in a circumferential pulse/echo or time of flight (TOF) configuration according to examples of the disclosure.

FIG. 6D illustrates an ultrasonic transmitter/receiver pair operating in a circumferential pitch/catch or tomography (imaging using penetrating waves) configuration according to examples of the disclosure.

DETAILED DESCRIPTION

Figure 1A:
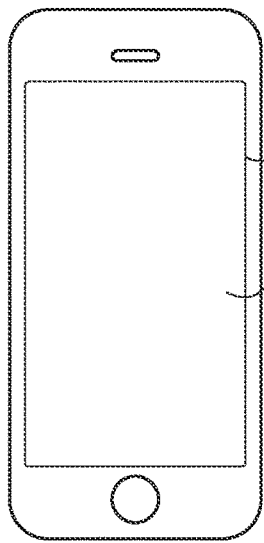
FIGS. 1A-1G illustrate systems that can employ ultrasonic touch sensing with parasitic wave rejection according to examples of the disclosure.

In the following description of various examples, reference is made to the accompanying drawings which form a part hereof, and in which it is shown by way of illustration specific examples that can be practiced. It is to be understood that other examples can be used and structural changes can be made without departing from the scope of the various examples.

Ultrasonic touch sensing systems can be adversely affected when an object unintentionally makes contact with the touch-sensitive surface, either alone or at the same time as an intended touch. These unintentional contacts can produce parasitic ultrasonic waves or reflections. When an unintended touch occurs alone (without a simultaneously occurring intended touch), the parasitic reflection caused by the unintended touch can be erroneously interpreted as indicative of an intended, valid touch. When an unintended touch occurs at the same time as an intended touch, the ultrasonic transducers may be unable to distinguish the parasitic reflections from true reflections caused by an intended touch (due to the rough symmetry of the true and parasitic reflections), and the parasitic reflections can corrupt the proper detection of the valid touch.

Accordingly, some examples of the disclosure are directed to improving the accuracy of ultrasonic touch sensing via the reduction, elimination and/or rejection of parasitic ultrasonic reflections. Fundamentally, the adverse effects of these parasitic reflections can be mitigated by disrupting the symmetry of the true reflections (from the intended touch) and the parasitic reflections. In one example, an absorbent material can be placed in a location where unintended object touches (e.g., from an ear or cheek) are expected, so that ultrasonic waves propagated in the direction of the unintended touching object are absorbed by the absorbent material, resulting in significant attenuation of the amplitude of the parasitic reflection as compared to the true reflection from an intended touch (e.g., from a finger). This attenuation of the parasitic wave can disrupt the symmetry of the amplitude of the parasitic and true reflections, which can allow for rejection of the parasitic reflection and processing of the true reflection. In another example, the ultrasonic transducer can be placed in an area where unintended object touches are expected, so that parasitic reflections can be received at the transducer earlier than true reflections from an intended touch. This time separation of the parasitic wave from the true wave can disrupt the symmetry of the parasitic and true reflections, which can allow for rejection of the parasitic reflection and processing of the true reflection. In yet another example, a multi-element phased array of ultrasonic transducers can be employed to selectively direct ultrasonic waves in different directions at different times. For example, the phased array can first direct ultrasonic waves towards an area where unintended object touches are expected, and then direct ultrasonic waves towards an area where intended touches are expected. The time separation of the directional ultrasonic waves can cause true reflections from an intended touch, and parasitic reflections from an unintended touch, to be received back at the array at different times. This time separation of the parasitic wave from the true wave disrupts the symmetry of the parasitic and true reflections, which can allow for rejection of the parasitic reflection and processing of the true reflection.

Figure 1B:
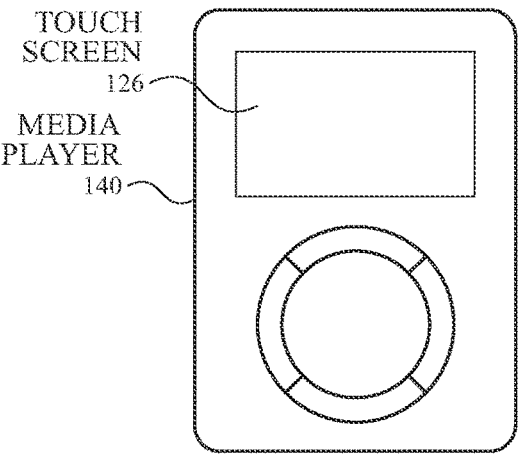
Figure 1C:
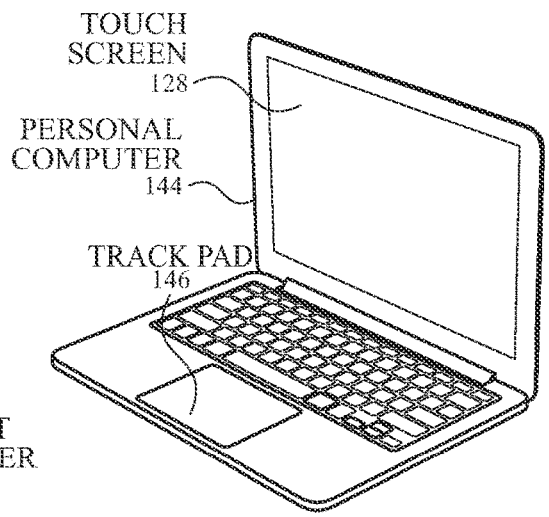
Figure 1D:
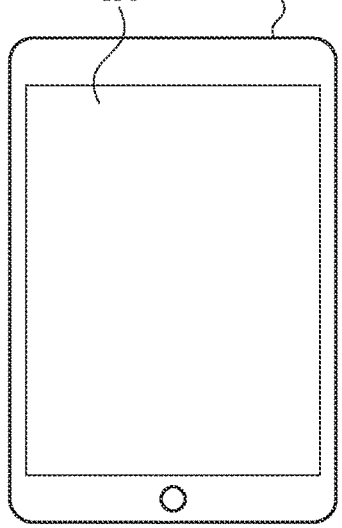
Figure 1E:
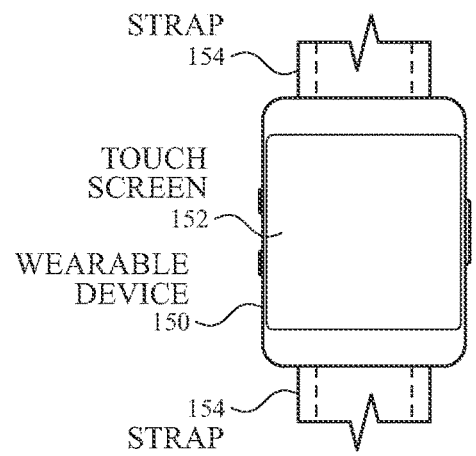
Figure 1F:
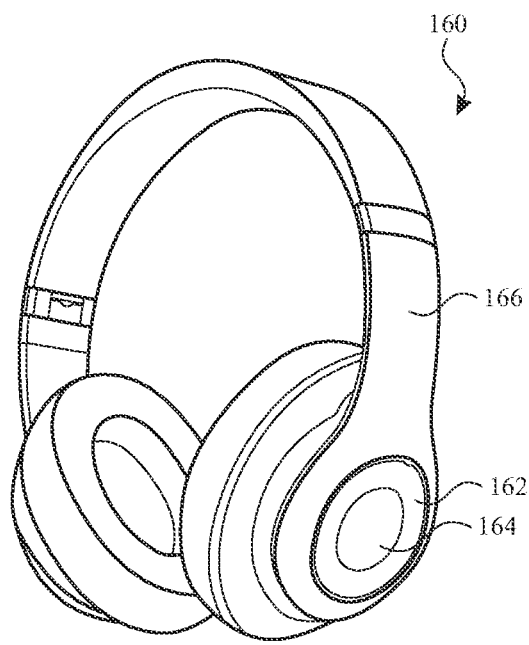
Figure 1G:
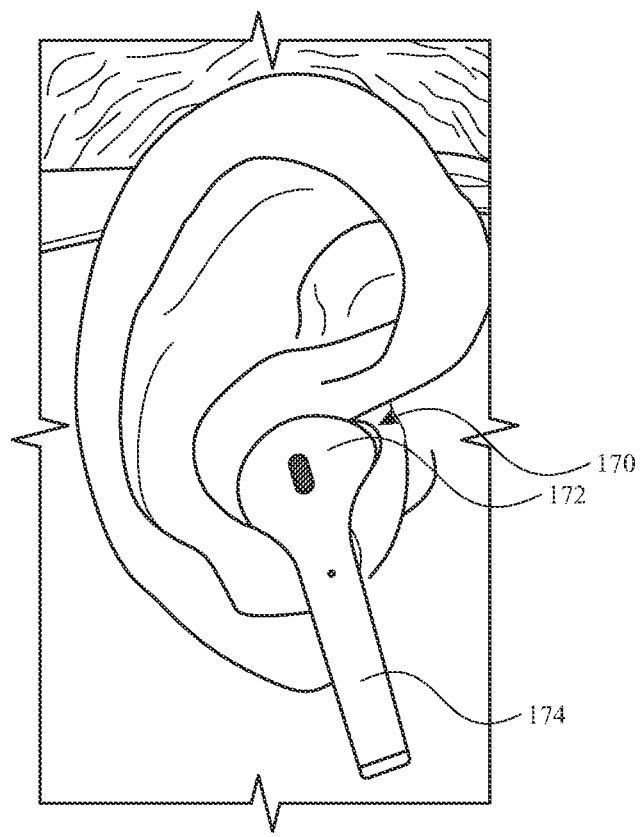

FIGS. 1A-1G illustrate systems that can employ ultrasonic touch sensing with parasitic wave rejection according to examples of the disclosure. FIG. 1A illustrates an exemplary mobile telephone 136 that can employ ultrasonic touch sensing with parasitic wave rejection according to examples of the disclosure. FIG. 1B illustrates an example digital media player 140 that can employ ultrasonic touch sensing with parasitic wave rejection according to examples of the disclosure. FIG. 1C illustrates an example personal computer 144 that can employ ultrasonic touch sensing with parasitic wave rejection according to examples of the disclosure. FIG. 1D illustrates an example tablet computing device 148 that can employ ultrasonic touch sensing with parasitic wave rejection according to examples of the disclosure. FIG. 1E illustrates an example wearable device 150 (e.g., a watch) that can employ ultrasonic touch sensing with parasitic wave rejection according to examples of the disclosure. FIG. 1F illustrates another example wearable device, over-ear headphones 160, that can employ ultrasonic touch sensing with parasitic wave rejection according to examples of the disclosure. FIG. 1G illustrates another example wearable device, in-ear headphones or earbuds 170, that can employ ultrasonic touch sensing with parasitic wave rejection according to examples of the disclosure. It should be understood that the example devices illustrated in FIGS. 1A-1G are provided by way of example, and other types of devices can employ ultrasonic touch sensing with parasitic wave rejection, and in some examples, can additionally employ force sensing.

Ultrasonic touch sensing and parasitic wave rejection can be incorporated in the above described systems to add touch sensing capabilities to a surface of the system. In some examples, a touch screen (e.g., capacitive, resistive, etc.) can be augmented with ultrasonic touch sensing and parasitic wave rejection to provide touch sensing capability in conditions where the device may get wet (e.g., exercise, swimming, rain, washing hands) or for use with non-conductive or partially-conductive touch objects (e.g., gloved or bandaged fingers) or poorly grounded touch objects (e.g., objects not in contact with the system ground of the device). In some examples, an otherwise non-touch sensitive display can be augmented with ultrasonic touch sensing and parasitic wave rejection to provide a touch sensing capability. In such examples, the display can be implemented without the stack-up required for a capacitive touch screen. In some examples, ultrasonic touch sensing and parasitic wave rejection can be used to provide touch sensing capability for a non-display surface. For example, ultrasonic touch sensing and parasitic wave rejection can be used to provide touch sensing capabilities on earbuds, a track pad (e.g., trackpad 146 of personal computer 144), a button, a scroll wheel, part or all of the housing, or any other surfaces of the device (e.g., on the front, rear or sides).

As the examples of FIGS. 1E-1G illustrate, some examples of the disclosure are particularly directed to wearable devices, which can provide users with immediately accessible input mechanisms for initiating or performing various functions. This user input can control the wearable device itself, or it can be converted to wireless communications for control of other devices such as smartphones, watches and the like. In some examples, ultrasonic touch sensing capability can be integrated within existing wearable device structures. In these examples, a user can tap, touch or slide one or more fingers along a touch-sensitive area (e.g., an area along the shaft), and ultrasonic transducers within the touch-sensitive area can detect these touches and sliding motions and initiate or perform functions such as volume control. For example, ultrasonic touch sensing and parasitic wave rejection can be integrated into over-ear headphones 160 (e.g., in exterior circular region 162, interior circular region 164, and/or over-head band 166) or in-ear headphones 170 (e.g., in earbud 172 or cylindrical antenna 174) to provide touch input (e.g., single-touch or multi-touch gestures including tap, hold and swipe). The touch sensing surfaces for ultrasonic touch sensing with parasitic wave rejection can be made of various materials (e.g., metal, plastic, glass, etc.) or a combination of materials.

Figure 2:
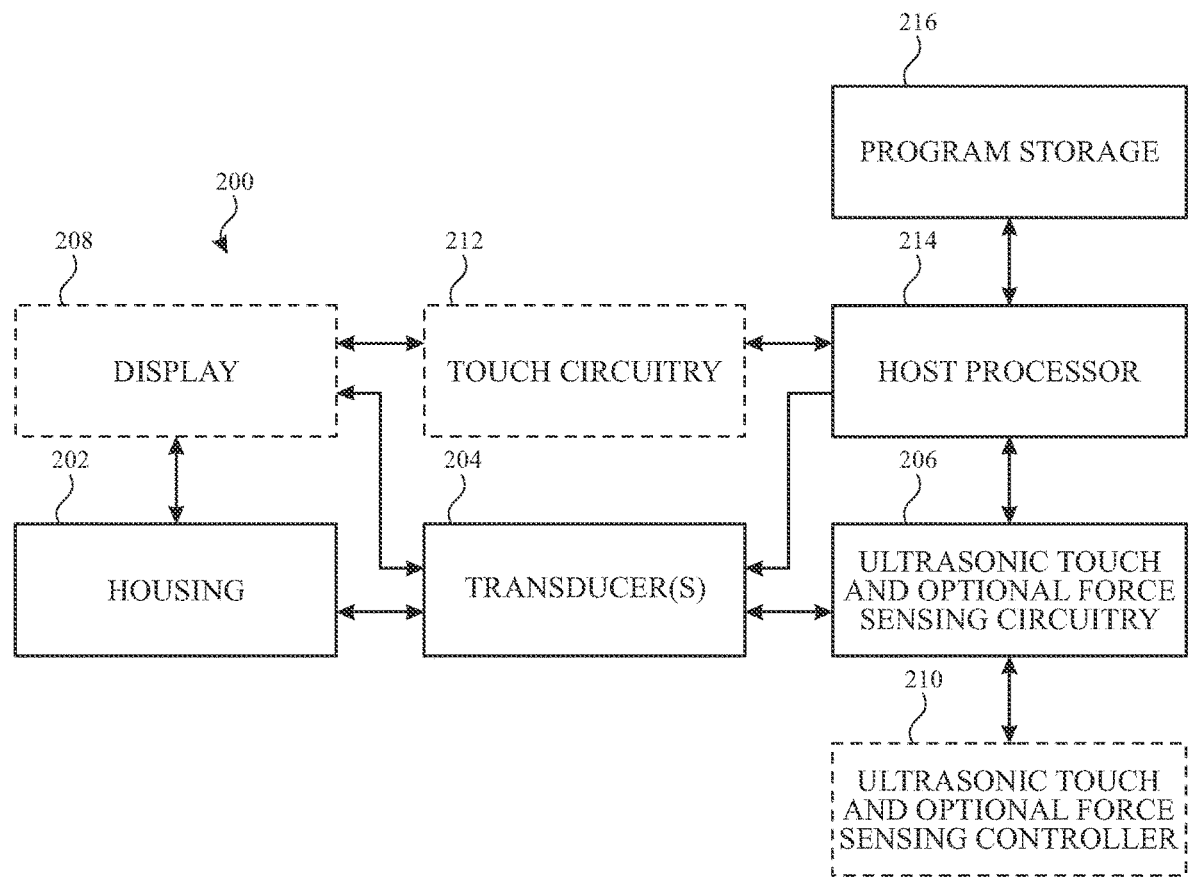
FIG. 2 illustrates a block diagram of an electronic device including ultrasonic touch sensing and parasitic wave rejection, and in some examples, an additional force sensing system according to examples of the disclosure.

FIG. 2 illustrates a block diagram of an electronic device including ultrasonic touch sensing and parasitic wave rejection, and in some examples, an additional force sensing system according to examples of the disclosure. In some examples, housing 202 of device 200 (e.g., corresponding to devices 136, 140, 144, 148, 150, 160 and 170 above) can be coupled (e.g., mechanically) with one or more ultrasonic transducers 204. In some examples, transducers 204 can be piezoelectric transducers, which can be made to vibrate by the application of electrical signals when acting as a transmitter, and generate electrical signals based on detected vibrations when acting as a receiver. In some examples, transducers 204 can be formed from a piezoelectric ceramic material (e.g., PZT or KNN) or a piezoelectric plastic material (e.g., PVDF or PLLA). In various examples, transducers 204 can be bonded to housing 202 by a bonding agent (e.g., a thin layer of stiff epoxy), deposited on one or more surfaces through processes such as deposition, lithography, or the like, or integrally formed within the housing. When electrical energy is applied to transducers 204 and causes them to vibrate, the one or more surfaces in contact with the transducers can also be caused to vibrate, and the vibrations of the molecules of the surface material can propagate as an ultrasonic wave through the one or more surfaces/materials. In some examples, vibration of transducers 204 can be used to produce ultrasonic waves at a selected frequency over a broad frequency range (e.g., 500 kHz-10 MHz) in the medium of the surface of the electronic device. It should be understood that other frequencies outside of the exemplary range above can be used while remaining within the scope of the present disclosure.

In some examples, transducers 204 can be partially or completely disposed on (or coupled to) a portion of display 208, which in some examples can be integrated with additional (non-ultrasonic) touch circuitry 212 to a form touch screen, although it should be understood that some example devices do not include either a display 208 or additional touch circuitry 212 (their optional nature indicated by dashed lines). Device 200 can further include ultrasonic touch and optional force sensing circuitry 206, which can include circuitry for driving electrical signals to stimulate vibration of transducers 204 (e.g., transmit circuitry), as well as circuitry for sensing electrical signals output by transducers 204 when the transducer is stimulated by received ultrasonic energy (e.g., receive circuitry). In some examples, timing operations for ultrasonic touch and optional force sensing circuitry 206 can optionally be provided by a separate ultrasonic touch and optional force sensing controller 210 that can control the timing of operations by ultrasonic touch and optional force sensing circuitry 206. In some examples, ultrasonic touch and optional force sensing controller 210 can be coupled between ultrasonic touch and optional force sensing circuitry 206 and host processor 214. In some examples, controller functions can be integrated with ultrasonic touch and optional force sensing circuitry 206 (e.g., on a single integrated circuit). Output data from ultrasonic touch and optical force sensing circuitry 206 can be output to a host processor 214 for further processing to determine a location of, and optionally a force applied by, an object contacting the device, and to reject parasitic ultrasonic wave reflections, as will be described in more detail below. In some examples, the processing for determining the location and optionally the force of the contacting object, and for rejecting parasitic ultrasonic wave reflections, can be performed by ultrasonic touch and optional force sensing circuitry 206, ultrasonic touch and optional force sensing controller 210 or a separate sub-processor of device 200 (not shown).

Host processor 214 can receive ultrasonic and optionally other touch sensor outputs (e.g., capacitive) and non-touch sensor outputs, reject parasitic ultrasonic wave reflections, and initiate or perform actions based on those sensor outputs. Host processor 214 can also be connected to program storage 216 and optionally to display 208. Host processor 214 can, for example, communicate with display 208 to generate an image on the display, such as an image of a user interface (UI), and can use ultrasonic touch and optional force sensing circuitry 206 (and, in some examples, their respective controllers), and in some examples, touch sensing circuitry 212, to detect a touch on or near display 208 and in some examples an applied force, such as a touch input and/or force input at the displayed UI. The touch input and/or force input can be used by computer programs stored in program storage 216 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 214 can also perform additional functions that may not be related to touch and/or force processing.

Note that one or more of the functions described herein, including the rejection of parasitic ultrasonic wave reflections, can be performed by firmware stored in memory and executed by ultrasonic touch and optional force sensing circuitry 206 (or their respective controllers), and in some examples, touch circuitry 212, or stored in program storage 216 and executed by host processor 214. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding a signal) that can contain or store the program for use by or in connection with the instruction execution system, apparatus, or device. The non-transitory computer readable medium storage can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

It is to be understood that device 200 is not limited to the components and configuration of FIG. 2, but can include other or additional components in multiple configurations according to various examples. Additionally, the components of device 200 can be included within a single device, or can be distributed between multiple devices. Additionally, it should be understood that the connections between the components is exemplary and different unidirectional or bidirectional connections can be included between the components depending on the implementation, irrespective of the arrows shown in the configuration of FIG. 2.

Figure 3:
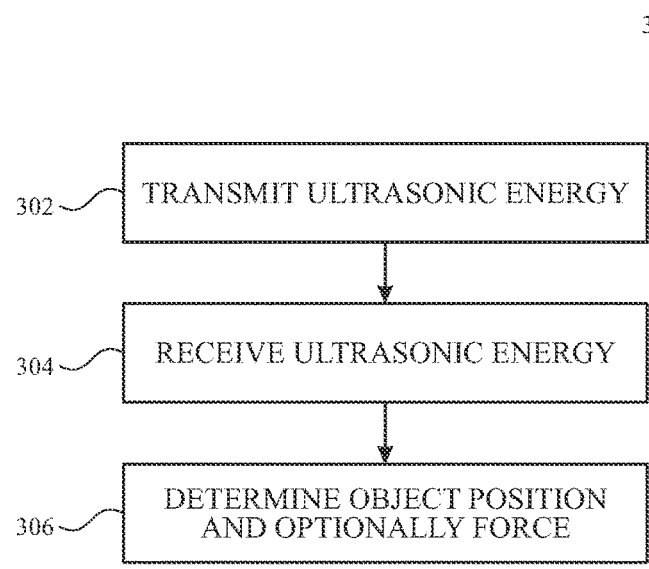
FIG. 3 illustrates a process for ultrasonic touch and optional force sensing of an object in contact with a touch and/or force sensitive surface according to examples of the disclosure.

FIG. 3 illustrates an exemplary process 300 for ultrasonic touch and optional force sensing of an object in contact with a touch and/or force sensitive surface, and for rejecting parasitic ultrasonic wave reflections according to examples of the disclosure. At 302, ultrasonic energy can be transmitted (e.g., by one or more transducers) along a surface and/or through the thickness of a material in the form of an ultrasonic wave. In some examples, the wave can propagate as a compressive wave, a guided wave such as a shear horizontal wave, a Rayleigh wave, a Lamb wave, a Love wave, or a Stoneley wave. Other propagation modes for the transmitted ultrasonic energy can also exist based on the properties of the surface material, geometry and the manner of energy transmission from the transducers to the surface of the device. In some examples, the surface can be formed from plastic, glass, sapphire crystal, metal, ceramics, or wood. Transmitted energy can propagate along the surface and/or through the thickness until a wave propagation discontinuity in the surface is reached (e.g., an object, such as a finger in contact with the surface), which can cause a portion of the energy to reflect. In some examples, a wave propagation discontinuity can occur at edges of the surface material (e.g., when the ultrasonic wave propagates to the edge of the surface opposite the transducer). When the transmitted energy reaches one of the wave propagation discontinuities described above, some of the energy can be reflected, and a portion of the reflected energy can be directed to one or more transducers. In some examples, water or other fluids in contact with the surface of the device will not act as a wave propagation discontinuity to the ultrasonic waves, and thus the ultrasonic touch sensing process can be effective for detecting the presence of an object (e.g., a user's finger) even in the presence of water drops (or other low-viscosity fluids) on the surface of the device or even while the device is fully submerged.

At 304, returning ultrasonic energy can be received, and the ultrasonic energy can be converted to an electrical signal by one or more transducers. At 306, the ultrasonic sensing system can determine whether one or more objects is contacting the surface of the device, and can further detect the position of one or more objects based on the received ultrasonic energy. In some examples, a distance of the object from the transmission source can be determined from a time-of-flight between transmission and reception of reflected energy, and a propagation rate of the ultrasonic wave through the material. In some examples, baseline reflected energy from one or more intentionally included wave propagation discontinuities (e.g., edges) can be compared to a measured value of reflected energy corresponding to the one or more wave propagation discontinuities. The baseline reflected energy can be determined during a measurement when no object (e.g., finger) is in contact with the surface. Deviations of the reflected energy from the baseline can be correlated with a presence of an object touching the surface. In some examples, parasitic ultrasonic wave reflections can be rejected.

Although process 300, as described above, generally refers to reflected waves received by the same transducer(s) that transmitted the waves, in some examples, the transmitter and receiver functions can be separated such that the transmission of ultrasonic energy at 302 and receiving ultrasonic energy at 304 may occur at different co-located transducers (e.g., one transducer in a transmit configuration and one transducer in a receive configuration). In some examples, the ultrasonic energy can be transmitted along and/or through the surface by one or more transducers and received at a different location along the surface by one or more additional transducers (not shown). The attenuation of the received ultrasonic energy can be used to detect the presence of and/or identify the position of one or more objects on the surface. Exemplary device configurations and measurement timing examples that can be used to implement process 300 will be described in further detail below. In some examples, the transmitted ultrasonic energy can be received at the transmitting transducer and also received at one or more other non-transmitting transducers located in different positions (e.g., at different locations along the surface). Energy can reflect from one or more objects at multiple angles, and the energy received at all of the receiving transducers can be used to determine the position of the one or more objects. In some examples, the non-transmitting transducers can be free of artifacts that can be associated with transmitting ultrasonic energy (e.g., ringing). In some examples, the energy can be received at two transducers perpendicular to the transmitting transistor.

Figure 4:
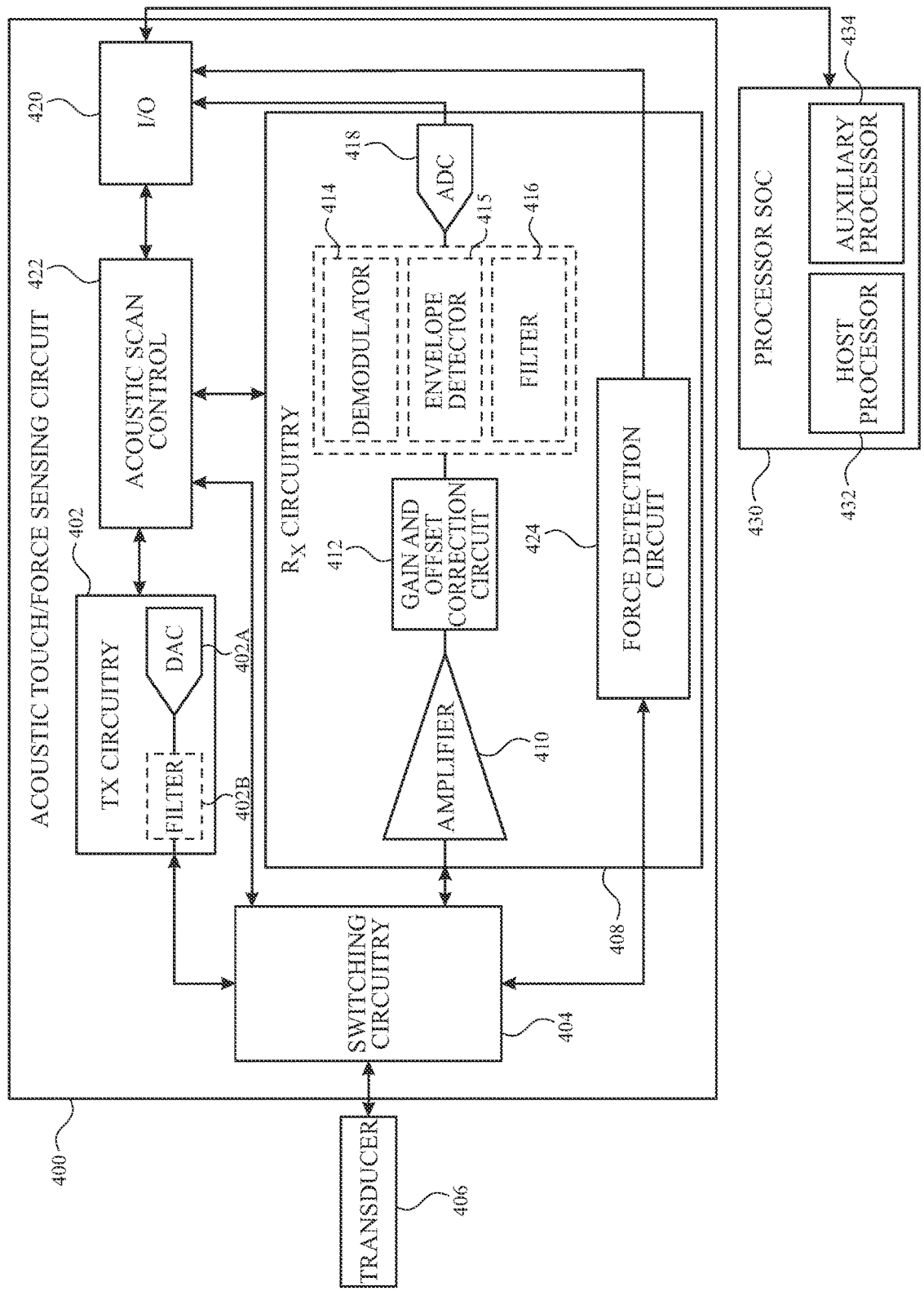
FIG. 4 illustrates an exemplary configuration of an ultrasonic touch and optional force sensing circuit according to examples of the disclosure.

FIG. 4 illustrates an exemplary configuration of an ultrasonic touch and optional force sensing circuit 400 according to examples of the disclosure. Ultrasonic touch and optional force sensing circuit 400 can include transmit circuitry (also referred to herein as Tx circuitry or transmitter) 402, switching circuitry 404, receive circuitry (also referred to herein as Rx circuitry or receiver) 408 and input/output (I/O) circuit 420 (which together can correspond to ultrasonic touch and optional force sensing circuitry 206) and ultrasonic scan control logic 422 (which can correspond to ultrasonic touch and optional force sensing controller 210). Transmitter 402, switching circuitry 404, receiver 408, I/O circuit 420 and/or ultrasonic scan control logic 422 can be implemented in an application specific integrated circuit (ASIC) in some examples. In some examples, ultrasonic touch and optional force sensing circuit 400 can also optionally include transducers 406 (which can correspond to transducers 204).

In some examples, a transmitter 402 can generate an electrical signal for stimulating movement of one or more of a plurality of transducers 406. In some examples, the transmitted signal can be a differential signal, and in some examples, the transmitted signal can be a single-ended signal. In some examples, transmitter 402 can be a simple buffer, and the transmitted signal can be a pulse (or burst of pulses at a particular frequency). In some examples, transmitter 402 can include a digital-to-analog converter (DAC) 402A and an optional filter 402B that can be optionally used to smooth a quantized output of DAC 402A. In some examples, characteristics of the transducer itself can provide a filtering property and filter 402B can be omitted. DAC 402A can be used to generate a transmit waveform (e.g., any transmit waveform suitable for the touch and optional force sensing operations discussed herein). In some examples, the transmit waveform output can be pre-distorted to equalize the channel. In some examples, the characteristics of each channel, such as the properties of the surface material coupled to transducers 406, the wave propagation discontinuities in the surface material, and the reflection characteristics of an edge of the device can be measured and stored. In some examples, the channel characteristics can be measured as a manufacturing step (or factory calibration step), and in other examples the characteristics can be measured as a periodic calibration step (i.e., once a month, once a year, etc. depending on how quickly the channel characteristics are expected to change). In some examples, the channel characteristics can be converted to a transfer function of the channel, and the transmit waveform can be configured using the inverse of the channel transfer function such that the returning signal is equalized (e.g., returning signal can be detected as a pulse or a burst of pulses despite the transmitted waveform having a seemingly arbitrary waveform). In some examples, a single differential pulse can be used as a transmit waveform. For example, a bipolar square pulse (where the voltage applied to the transducer can be both positive and negative) can be used as the transmit waveform, and the bipolar square pulse can be implemented using a single-ended or differential implementation. In some examples, an energy recovery architecture can be used to recover some of the energy required for charging and discharging the transducer.

Switching circuitry 404 can include multiplexers (MUXs) and/or demultiplexers (DEMUXs) that can be used to selectively couple transmitter 402 and/or receiver 408 to one of transducers 406 that can be the active transducer for a particular measurement step in a measurement cycle. In a differential implementation, switching circuitry 404 can include two MUXs and two DEMUXs. In some examples, a DEMUX can have a ground connection, and the non-selected DEMUX outputs can be shorted, open, or grounded. In some examples, the same transducer 406 can be coupled to transmitter 402 by switching circuitry 404 (e.g., DEMUXs) during the drive mode and coupled to receiver 408 by switching circuitry 404 (e.g., MUXs) during the receive mode. Thus, in some examples, a single transducer 406 can be used both for transmitting and receiving ultrasonic energy. In some examples, a first transducer can be coupled to transmitter 402 by switching circuitry 404 (e.g. DEMUXs) and a second transducer can be coupled by switching circuitry 404 (e.g., MUXs) to receiver 408. For example, the transmitting transducer and the receiving transducer can be discrete piezoelectric elements, where the transmitting transducer can be designed for being driven by higher voltages (or currents) to produce sufficient motion in transducer 406 to generate an ultrasonic wave in the surface of a device (e.g., device 200 above), and the receiving transducer can be designed for receiving smaller amplitude reflected energy. In such a configuration, the transmit-side circuitry (e.g., transmitter 402 and DEMUXs of switching circuitry 404) can be optionally implemented on a high voltage circuit, and the receive-side circuitry (e.g., receiver 408 and MUXs of switching circuitry 404) can be optionally implemented on a separate low voltage circuit. In some examples, switching circuitry 404 (MUXs and DEMUXs) can also be implemented on the high voltage circuit to properly isolate the remaining receive-side circuitry (e.g., receiver 408) during transmission operations by transmit side circuitry. Additionally or alternatively, in some examples, the transmit circuit can include an energy recovery architecture that can be used to recover some of the energy required for charging and discharging the transducer. It should be understood that for a single-ended implementation, switching circuitry 404 can include a single DEMUX and MUX. In such a configuration, transmitter 402 and receiver 408 can be single-ended as well. Differential implementations, however, can provide improved noise suppression over a single-ended implementation.

Receiver 408 can include an amplifier 410 such as a low-noise amplifier (LNA) configured to sense the transducer. Receiver 408 can also include a gain and offset correction circuit 412. The gain and offset correction circuit can include a programmable gain amplifier (PGA) configured to apply gain to increase (or in some cases decrease) the amplitude of the signals received from LNA. The PGA can also be configured to filter (e.g., low pass) the signals received from the LNA to remove high frequency components. Additionally, the PGA circuit can also be configured to perform baselining (offset correction).

In some examples, the output of gain and offset correction circuit 412 can optionally be coupled to one or more analog processing circuits. In some examples, the output of gain and offset correction circuit 412 can be coupled to a demodulation circuit 414 configured to demodulate the received signals (e.g., by I/Q demodulation). In some examples, the output of the gain and offset correction circuit 412 can be coupled to an envelope detection circuit 415 configured to perform envelope detection on the received signals. In some examples, the output of gain and offset correction circuit 412 can be filtered at filter 416. In some examples, these blocks/circuits can be placed in a different order. In some examples, the processing of one or more of these analog processing circuits can be performed in the digital domain.

The received signals, whether raw or processed by one or more of demodulation circuit 414, envelope detection circuit 415 or filter 416, can be passed to an analog-to-digital converter (ADC) 418 for conversion to a digital signal. In some examples, an input/output (I/O) circuit 420 can be used to transmit received data for processing. In some examples, the output of I/O circuit 420 can be transferred to a host processor of the device, or to an auxiliary processor (sub-processor) separate from the host processor. For example, as illustrated, the output of I/O circuit 420 can be coupled to a processor system-on-chip (SoC) 430, which can include one or more processors. In some examples, processor SoC 430 can include a host processor 432 (e.g., an active mode processor) and an auxiliary processor 434 (e.g., a low power processor). In some examples, some digital signal processing can be performed (e.g., by ultrasonic touch and optional force sensing circuit 400) before transmitting the data to other processors in the system (e.g., processor SoC 430). In some examples, the I/O circuit 420 is not only used for data transfer to processor SoC 430 (e.g., host processor 432), but also is used for writing the control registers and/or firmware download from processor SoC 430.

The components of receiver circuitry 408 described above can be implemented to detect touch (e.g., presence and location of a touch on a surface). In some examples, receiver 408 can also include a force detection circuit 424 to detect applied force (e.g., of the touch on the surface). In some examples, the force detection circuit 424 can include the same or similar components as described above (e.g., amplifier, gain and offset correction, etc.). In some examples, the function of force detection circuit 424 can be performed using the same components described above that are used to determine time-of-flight for touch detection. In some examples, a low-power time gating circuit can be used to determine time-of-flight for force detection. Data from force sensing circuit 424 can be transferred to I/O circuit 420 and/or processor SoC 430 for further processing of force data in a similar manner as described above for touch data. In some examples the same circuitry for touch detection can be used to detect force.

A control circuit, ultrasonic scan control circuit 422, can be used to control timing and operations of the circuitry of ultrasonic touch and optional force sensing circuit 400. Ultrasonic scan control circuit 422 can be implemented in hardware, firmware, software or a combination thereof. In some examples, ultrasonic scan control circuit 422 can include digital logic and timing control. Digital logic can provide the various components of ultrasonic touch and/or sensing circuit 400 with control signals. A timing control circuit can generate timing signals for ultrasonic touch and optional force sensing circuit 400 and generally sequence the operations of ultrasonic touch and optional force sensing circuit 400. In some examples, the ultrasonic touch and optional force sensing circuit 400 can receive a master clock signal from an external source (e.g., clock from the host processor, crystal oscillator, ring oscillator, RC oscillator, or other high-performance oscillator). In some examples, an on-chip oscillator can be used to generate the clock. In some examples, a master clock signal can be generated by an on-chip phase locked loop (PLL), included as part of ultrasonic touch and optional force sensing circuit 400, using an external clock as the input. In some examples, a master clock signal can be routed to the ultrasonic touch sensing circuit from processor SoC 430. The appropriate master clock source can be determined based on a tradeoff between area, thickness of the stack-up, power and electromagnetic interference.

It is to be understood that the configuration of FIG. 4 is not limited to the components and configuration of FIG. 4, but can include other or additional components (e.g., memory, signal processor, etc.) in multiple configurations according to various examples. Additionally, some or all of the components illustrated in FIG. 4 can be included in a single circuit, or can be divided among multiple circuits while remaining within the scope of the examples of the disclosure.

Examples of the disclosure are directed to improving the accuracy of ultrasonic touch sensing via the reduction, elimination and/or rejection of parasitic ultrasonic reflections in devices such as desktop, laptop and tablet computing devices, smartphones, media players, wearables such as watches and health monitoring devices, smart home control and entertainment devices, headphones and earbuds, and devices for computer-generated environments such as augmented reality, mixed reality, or virtual reality environments. Some examples of the disclosure are particularly directed to wearable devices, which can provide users with immediately accessible input mechanisms for initiating or performing various functions.

Figure 5:
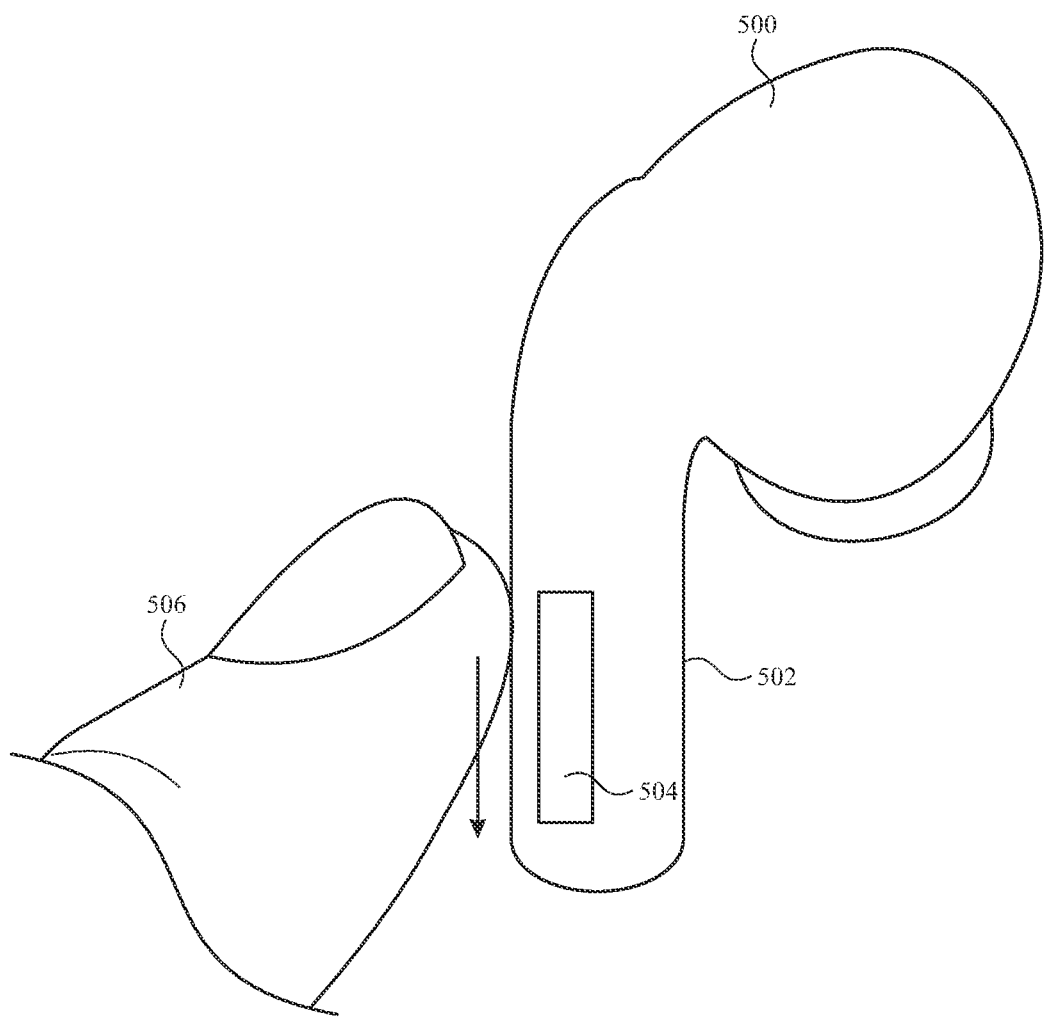
FIG. 5 illustrates a wearable device in the form of wireless earbud according to examples of the disclosure.

FIG. 5 illustrates a wearable device in the form of wireless earbud 500 according to examples of the disclosure. Some devices, such as earbud 500, can have limits on the implementation and placement of touch sensors such as capacitive touch sensors, due to the interference of the touch electrodes with other device operations. In the example of FIG. 5, earbud 500 can include cylindrical shaft 502 that can include antenna 504. Although cylindrical shaft 502 may be a logical location to provide user touch input, such as by sliding finger 506 over a portion of the shaft to provide volume control, utilizing capacitive touch sensing in that location can interfere with the performance of antenna 504. In addition, particularly in wearable devices such as earbud 500, which may be used outdoors, for exercise, and in other situations where water or perspiration may be present, capacitive touch electrodes can be adversely affected by water or perspiration droplets. Capacitive touch electrode performance can also suffer in the presence of insulated objects such as gloved fingers, which can be expected when wearable devices are used outside in cold weather.

Unlike capacitive touch sensing systems, in some ultrasonic touch sensing systems the transducers/electrodes can be implemented far from touch areas, and long-range touch sensing can be achieved (e.g., sonar). Accordingly, when electronics such as antennas are co-located with active touch areas, these ultrasonic systems are less likely to adversely affect those electronics. In addition, ultrasonic touch sensing systems can be less affected when conductive, electrically-floating liquids (e.g., water droplets) or insulated objects (e.g., gloved fingers) come into contact with its touch-sensitive surface.

FIG. 6A illustrates cylinder 602 with circumferential ultrasonic touch sensing according to examples of the disclosure. Although a cylinder is illustrated in the example of FIG. 6A and in other examples illustrated and explained herein, it should be understood that any reference to a cylindrical shape and axial, circumferential and radial implementations are for convenience of explanation only, and that examples of the disclosure can include other shapes that allow for ultrasonic waves to travel similarly, such as longitudinally along an axis, transversely along a surface such as a perimeter, and/or orthogonally with respect to the surface. In the example of FIG. 6A, one-dimensional multi-pixel array 608 of ultrasonic transducers can be located axially along a length of cylinder 602 to detect finger 606. Note that although the term "finger" may be used throughout this disclosure as causing the intended touch, its use is merely for convenience of explanation, and it should be understood that intended touches from objects other than fingers (e.g., a stylus, knuckle, wand, writing implement, etc.) fall within examples of the disclosure.

FIG. 6B illustrates one-dimensional multi-pixel array 608 of ultrasonic transducers 610 for circumferential ultrasonic touch sensing according to examples of the disclosure. Although the example of FIG. 6B illustrates 10 pixels (i.e., 10 ultrasonic transducers), any number of pixels can be employed, with more pixels generally providing more accurate touch localization. In some examples, the ultrasonic transducers can be formed from piezo material such as potassium sodium niobate (KNN), aluminum nitride (AlN), and polyvinylidene fluoride (PVDF), and can be glued to a wall of cylinder 602.

FIG. 6C illustrates an ultrasonic transducer 610 operating in a circumferential pulse/echo or time of flight (TOF) configuration according to examples of the disclosure. Although only one transducer 610 is shown in the cross-sectional view of FIG. 6C, multiple transducers may be present in a one-dimensional multi-pixel array, as in FIG. 6B. In the example of FIG. 6C, transducer 610 can transmit an ultrasonic incident guided wave (GW) 612. Although FIG. 6C only shows incident GW 612 propagating in the counterclockwise direction, in some examples GWs can propagate in both directions, counterclockwise and clockwise, and in other examples, GWs can be directionally controlled to propagate primarily in one direction, with minimal propagation in the other direction. In some examples, each transducer 610 in array 608 can generate an incident GW 612 one at a time, in series, while some or all transducers 610 can receive reflections 614 of that incident GW (i.e., a modified GW) after encountering a boundary created by discontinuities in the wave propagation characteristics of the material of the cylinder caused by a touching object or finger 606 at about the same time. Time-of-flight (TOF) algorithms can thereafter be applied to reflection data (if any) received at each transducer to localize the finger.

FIG. 6D illustrates an ultrasonic transmitter/receiver pair 616 and 618 operating in a circumferential pitch/catch or tomography (imaging using penetrating waves) configuration according to examples of the disclosure. Although only one transmitter/receiver pair 616 and 618 is shown in the cross-sectional view of FIG. 6D, multiple transmitter/receiver pairs may be present in a one-dimensional multi-pixel array 608, as in FIG. 6B. In the example of FIG. 6D, transmitter 616 can transmit an ultrasonic incident GW 612. Although FIG. 6D only shows incident GW 612 propagating in the counterclockwise direction, in some examples GWs can propagate in both directions, counterclockwise and clockwise, and in other examples, GWs can be directionally controlled to propagate primarily in one direction, with minimal propagation in the other direction. In some examples, each transmitter 616 in array 608 can generate incident GWs 612 one at a time, in series, while some or all receivers 618 can receive unabsorbed GW 620 (i.e., an incident GW that has been modified after encountering object or finger 606 and is comprised of energy from incident GW 612 that was not reflected and/or absorbed by a wave propagation discontinuity in the material of cylinder 602 caused by finger 606 and instead passes through the discontinuity and continues to propagate in the counter-clockwise direction), and tomography algorithms can thereafter be applied to the receive data (if any) at each receiver to localize the finger.

Figure 7A:
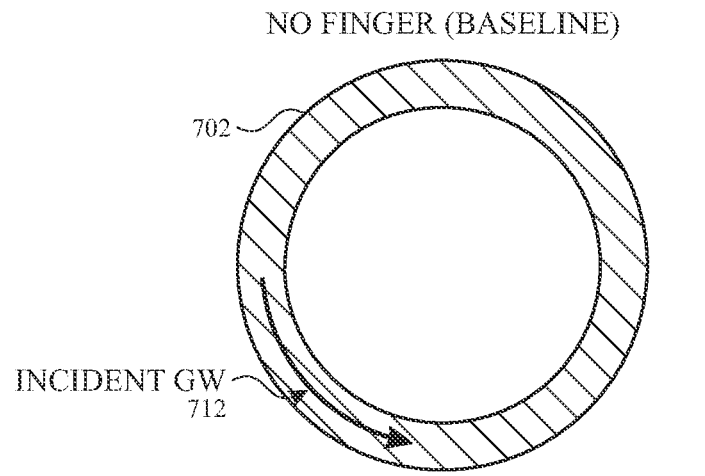
FIGS. 7A and 7B illustrate the baselining of reflected and partially absorbed guided waves (GWs) according to examples of the disclosure.
Figure 7B:
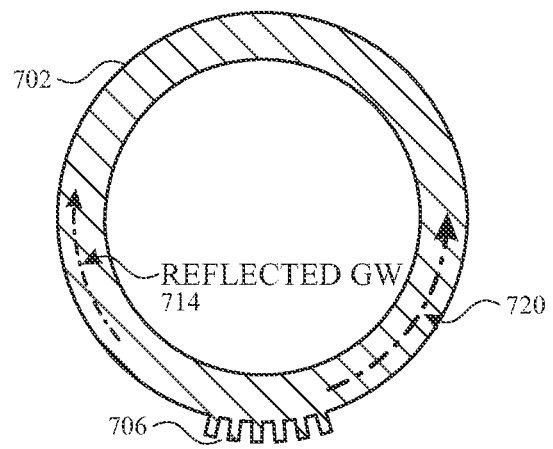

FIGS. 7A and 7B illustrate the baselining of reflected and partially absorbed GWs according to examples of the disclosure. FIG. 7A illustrates the propagation of ultrasonic incident GW 712 (directed primarily in the counterclockwise direction) in the absence of a finger according to examples of the disclosure. In the example of FIG. 7A, incident GW 712 originates at the 9 o'clock position of cylinder 702, and in the absence of any finger touch, propagates in a counterclockwise direction largely unimpeded (the secondary or opposing GW propagating in the clockwise direction is not shown in FIG. 7A).

FIG. 7B illustrates reflected GW 714 and unabsorbed GW 720 in the presence of finger 706 according to examples of the disclosure. In the example of FIG. 7B, an incident GW (not shown) originates at the 9 o'clock position of cylinder 702, and modified or reflected GW 714 is generated due to encountering (e.g., reflecting off) the wave propagation discontinuity caused by finger 706 at the 6 o'clock position. However, only a small amount of the incident GW is absorbed or reflected by the wave propagation discontinuity caused by finger 706, and most of the incident GW continues as modified or unabsorbed GW 720.

Although FIG. 7B only illustrates reflected GW 714 returning from the location of finger 706 to be received by a transducer (not shown), in some examples an ultrasonic transducer mounted to an interior of cylinder 702 may first receive large amplitude reflections from the outer surface of the cylinder, followed by reflected GW 714. The amplitude of reflected GW 714 can depend on the material of the cylinder. For example, if ABS plastic is used, a 1V p-p excitation signal can generate reflected GW 714 with an amplitude of about 1 mV p-p, which can provide for adequate touch localization. In general, plastics can have a much closer impedance match with a finger than glass or aluminum, so a finger and a plastic touch surface can interact to produce reflections and absorption of ultrasonic waves sufficient for adequate touch localization. In particular, hard plastics such as ABS or polycarbonate can produce less attenuation of ultrasonic signals in the general propagation path as compared to softer plastics. For example, the attenuation of an ultrasonic signal through ABS plastic at 5 MHz is about 1.1 dB/mm, and at 2 MHz the attenuation is about 0.5 to 0.2 dB/mm, all of which can provide for adequate touch localization.

Figure 7C:
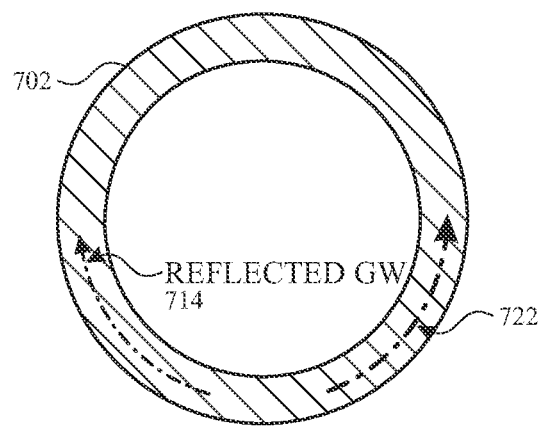
FIG. 7C illustrates the determination of a finger signature from reflected and unabsorbed GWs according to examples of the disclosure.

FIG. 7C illustrates the determination of a finger signature from modified (reflected and unabsorbed) GWs according to examples of the disclosure. In the example of FIG. 7C, absorbed GW 722 is the result of the subtraction of unabsorbed GW 720 from incident GW 712, and represents the amount of energy absorbed or reflected by the finger. Subtracting reflected GW 714 from absorbed GW 722 results in the amount of energy absorbed, but not reflected, by the finger. Together, absorbed GW 722 and reflected GW 714 represents a finger signature for a finger 706 touching cylinder 702 at the 6 o'clock position. This finger signature can be used to determine touch localization in either TOF or pitch-catch touch sensing. In a TOF/pulse-echo system, the circumferential location of a finger can be determined based on the round-trip time of reflected GW 714 and the known speed of sound in the cylinder material. The axial location of the finger can be determined by having multiple pixels along the cylinder axis. If a finger is in the path of an incident GW transmitted from an ultrasonic transducer (i.e., pixel), a reflection should be received by the pixel; otherwise, no reflection will be detected. In a pitch-catch system, the axial location of the finger can be determined by measuring the energy in absorbed GW 722 at each pixel along the axis. If the energy in absorbed GW 722 is non-zero, it can be assumed that a finger is present at that axial location. In a more general case, tomography can be utilized to create a two-dimensional (2D) image.

Figure 8A:
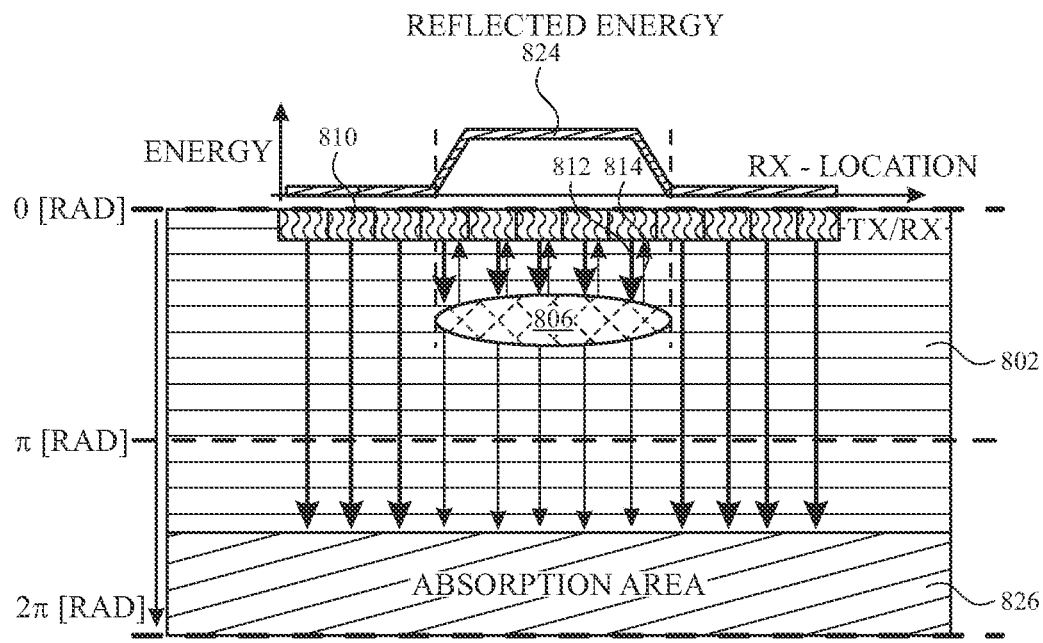
FIG. 8A illustrates circumferential pulse-echo or TOF ultrasonic touch sensing according to examples of the disclosure.

FIG. 8A illustrates circumferential pulse-echo or TOF ultrasonic touch sensing according to examples of the disclosure. In the example of FIG. 8A, cylinder 802 (e.g., the cylinder of FIG. 6C) is shown in a flattened configuration for ease of explanation, including optional absorption area 826 (to be described in further detail below). Ultrasonic incident GWs 812 can be launched downward (with respect to the orientation of FIG. 8A) from an array of ultrasonic transducers 810 in series, in some examples from left to right (although in other examples incident GWs 812 can be launched from transducers 810 in series in any order, including a series of non-adjacent transducers). Wave propagation discontinuities caused by finger 806 and encountered by incident GWs 812 can cause modified GWs (reflected GWs 814) to be received back at transducers 810 (while other GWs unblocked by the discontinuities are not reflected), which creates a rise in the reflected energy plot 824 in certain areas and can enable finger localization in the axial direction. In addition, based on TOF measurements (how long it took for incident GW 812 to be reflected and received back at the transducer), an outline of the leading edge of finger 806 (i.e., the finger touch boundary closest to the transducers) can be localized in the circumferential direction. Although FIG. 8A illustrates reflected GWs 814 being received only by the same transducers 810 that generated the incident GWs 812 being reflected, in other examples the incident GWs can reflect back at multiple angles, where they can be received by multiple transducers 810 at about the same time. Tomography algorithms can then be applied to the reflected GW data from the multiple transducers to enable finger localization of both the leading and distal finger touch boundaries in the circumferential direction.

Finger localization in the axial and circumferential directions can allow for two-dimensional (2D) touch sensing, which can enable gesture detection. For example, a 2D virtual slider can detect finger movement in multiple directions, and initiate or perform multiple operations based on those directions (e.g., up/down swipes for volume control, left/right swipes for changing audio tracks). Even if only a one-dimensional (1D) virtual slider is available, having 2D sensing can improve the performance of the slider. For example, if a finger slides diagonally over a 1D slider, only a small portion of the finger slide may be detected, but with 2D sensing, the diagonal motion can be fully detected and mapped back to 1D motion. In another example, if the speed of finger motion over a 1D slider is utilized as a parameter, 2D sensing can more accurately determine the speed of a diagonal slide as compared to 1D sensing, which might detect the entire slide, but with less apparent velocity.

Figure 8B:
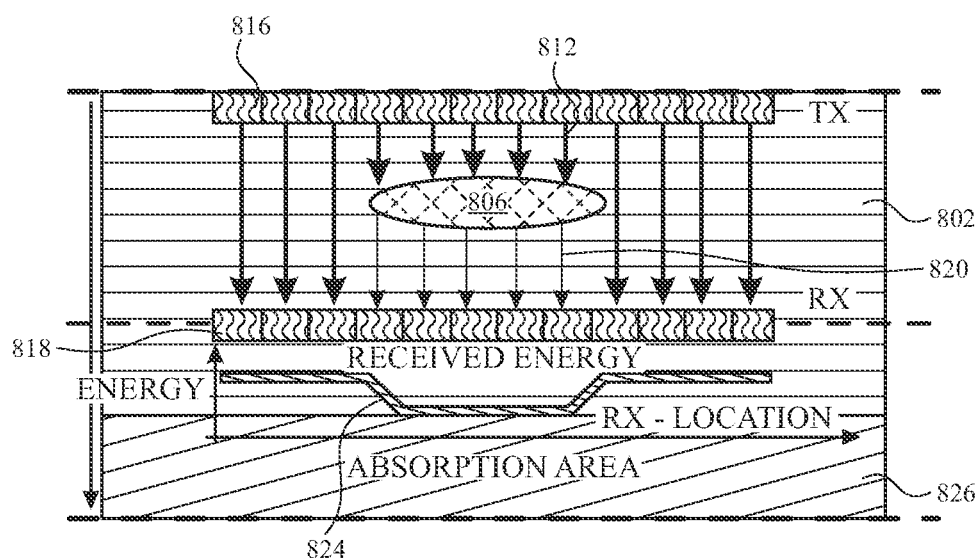
FIG. 8B illustrates circumferential pitch-catch ultrasonic touch sensing according to examples of the disclosure.

FIG. 8B illustrates circumferential pitch-catch ultrasonic touch sensing according to examples of the disclosure. In the example of FIG. 8B, cylinder 802 (e.g., the cylinder of FIG. 6D) is shown in a flattened configuration for ease of explanation, including optional absorption area 826 (to be described in further detail below). Ultrasonic incident GWs 812 can be launched downward (with respect to the orientation of FIG. 8B) from an array of ultrasonic transmitters 816 in series, in some examples from left to right. Wave propagation discontinuities caused by finger 806 and encountered by incident GWs 812 can cause some amount of reflection, but most of the energy in the form of modified GWs (unabsorbed GWs 820) can continue to propagate in the same direction as GW 812 until they are received by receivers 818. Other GWs unblocked by the wave propagation discontinuities are not reflected. The different energy levels of unabsorbed GWs 820 and unblocked GWs can create a decrease in the reflected energy plot 824 in certain areas and can enable finger localization in the axial direction. Although FIG. 8B illustrates unblocked incident GWs 812 or unabsorbed GWs 820 being received directly into receivers 818 along the same circumferential path as the transmitters 816 that generated the incident GWs 812, in other examples the unabsorbed GWs can exit the wave propagation discontinuity area caused by object 806 at multiple angles, where they can be received by multiple receivers 818 at about the same time. Tomography algorithms can thereafter be applied to the received data at the multiple receivers 818 to enable finger localization in the circumferential direction. Finger localization in the axial and circumferential directions can allow for two-dimensional (2D) touch sensing, which can enable gesture detection as described above with respect to FIG. 8A.

Figure 8C:
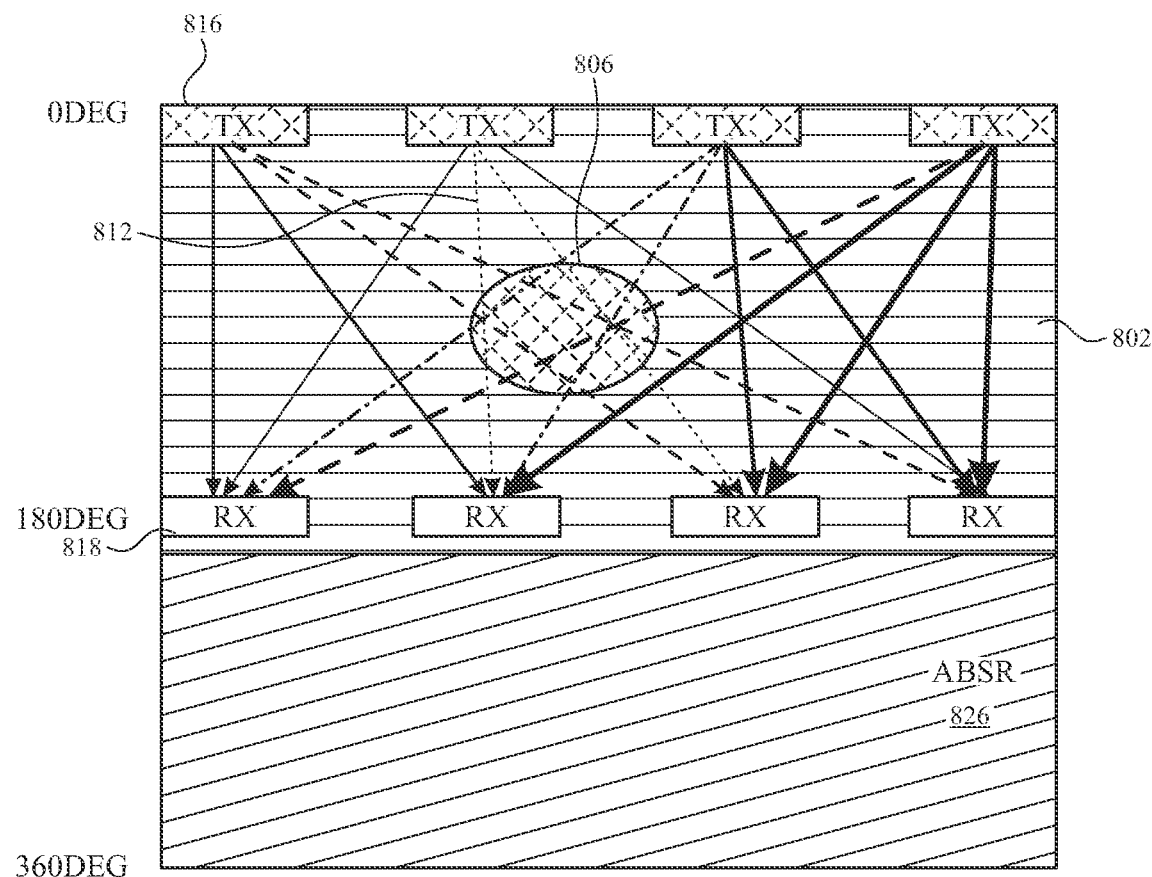
FIG. 8C illustrates circumferential pitch-catch ultrasonic touch sensing using tomography according to examples of the disclosure.

FIG. 8C illustrates circumferential pitch-catch ultrasonic touch sensing using tomography according to examples of the disclosure. In the example of FIG. 8C, all ultrasonic transmitters 816 can transmit sequentially, and receivers 818 can measure the energy from each transmitter. If finger 806 is present in touch detection area, certain transmitter-to-receiver paths should experience an energy change. If sufficient numbers of transmitter (Tx) and receivers (Rx) are present, a 2D image can be generated.

Figure 9A:
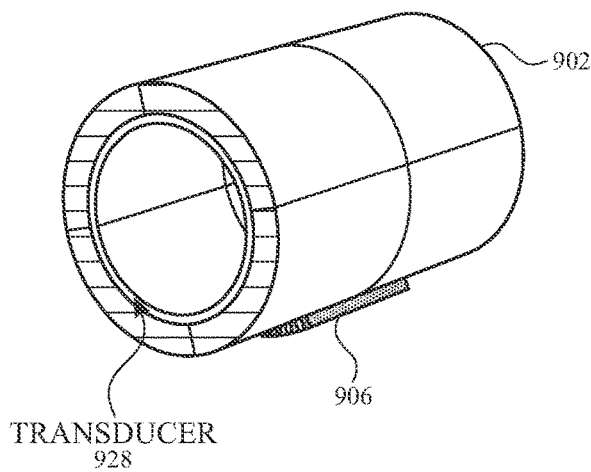
FIG. 9A illustrates a cylinder with axial ultrasonic touch sensing according to examples of the disclosure.

FIG. 9A illustrates cylinder 902 with axial ultrasonic touch sensing according to examples of the disclosure. In the example of FIG. 9A, a one-dimensional multi-pixel array 928 of ultrasonic transducers can be located at least partially circumferentially around cylinder 902 and affixed to a surface of the cylinder to detect finger 906. Although FIG. 9A illustrates array 928 located along an entire circumference of cylinder 902 at one edge of the cylinder, in other examples the transducers may only extend partially around a circumference of the cylinder, and may be located away from the edge of the cylinder.

Figure 9B:
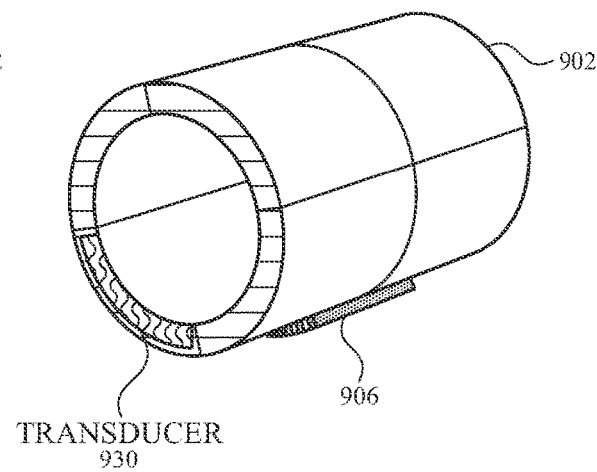
FIG. 9B illustrates a cylinder with embedded axial ultrasonic touch sensing according to examples of the disclosure.

FIG. 9B illustrates cylinder 902 with embedded axial ultrasonic touch sensing according to examples of the disclosure. In the example of FIG. 9B, a one-dimensional multi-pixel array 930 of ultrasonic transducers can be located at least partially circumferentially around cylinder 902 and embedded within the cylinder to detect finger 906. Although FIG. 9B illustrates array 930 located only partially circumferentially around cylinder 902 at one edge of the cylinder, in other examples the transducers can extend entirely around a circumference of the cylinder, and can be located away from the edge of the cylinder.

Figure 9C:
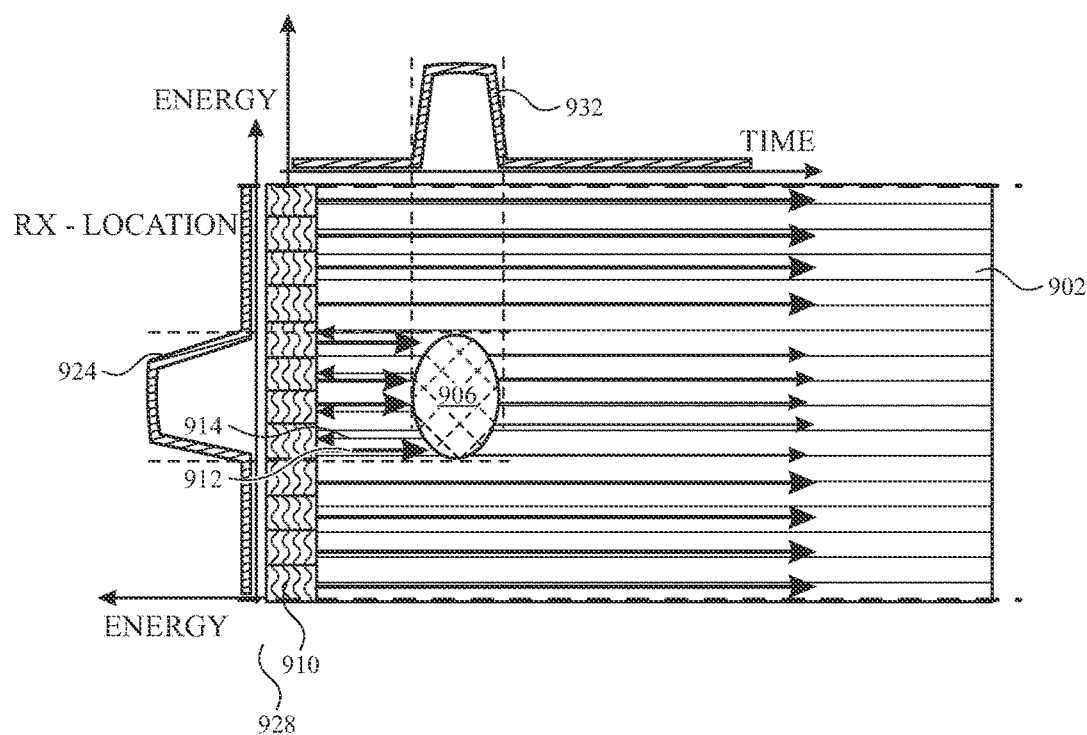
FIG. 9C illustrates axial pulse-echo or TOF ultrasonic touch sensing according to examples of the disclosure.

FIG. 9C illustrates axial pulse-echo or TOF ultrasonic touch sensing according to examples of the disclosure. In the example of FIG. 9C, cylinder 902 (e.g., the cylinder of FIG. 9A) is shown in a flattened configuration for ease of explanation. Ultrasonic incident GWs 912 can be launched to the right (with respect to the orientation of FIG. 9C) from an array 928 of ultrasonic transducers 910 in series, in some examples from bottom to top. Wave propagation discontinuities caused by finger 906 and encountered by incident GWs 912 can cause modified GWs (reflected GWs 914) to be received back at transducers 910 (while other GWs unblocked by the wave propagation discontinuities are not reflected), which creates a rise in the reflected energy plot 924 in certain areas and can enable finger localization in the circumferential direction. In addition, based on TOF measurements (how long it took for incident GW 912 to be reflected and received back at the transducer), an outline of the leading edge of finger 906 (i.e., the finger touch boundary closest to the transducers) can be localized in the axial direction. Although FIG. 9C illustrates reflected GWs 914 being received only by the same transducers 910 that generated the incident GWs 912 being reflected, in other examples the incident GWs can reflect back at multiple angles, where they can be received by multiple transducers 910 at about the same time. Tomography algorithms can then be applied to the reflected GW data from the multiple transducers to enable finger localization of both the leading and distal finger touch boundaries in the axial direction, as shown in plot 932. Finger localization in the axial and circumferential directions can allow for two-dimensional (2D) touch sensing, which can enable gesture detection as described above.

Although not shown in FIG. 9C, in some examples of the disclosure axial pitch-catch ultrasonic touch sensing can be employed in a manner similar to that shown in FIG. 8B.

Figure 10:
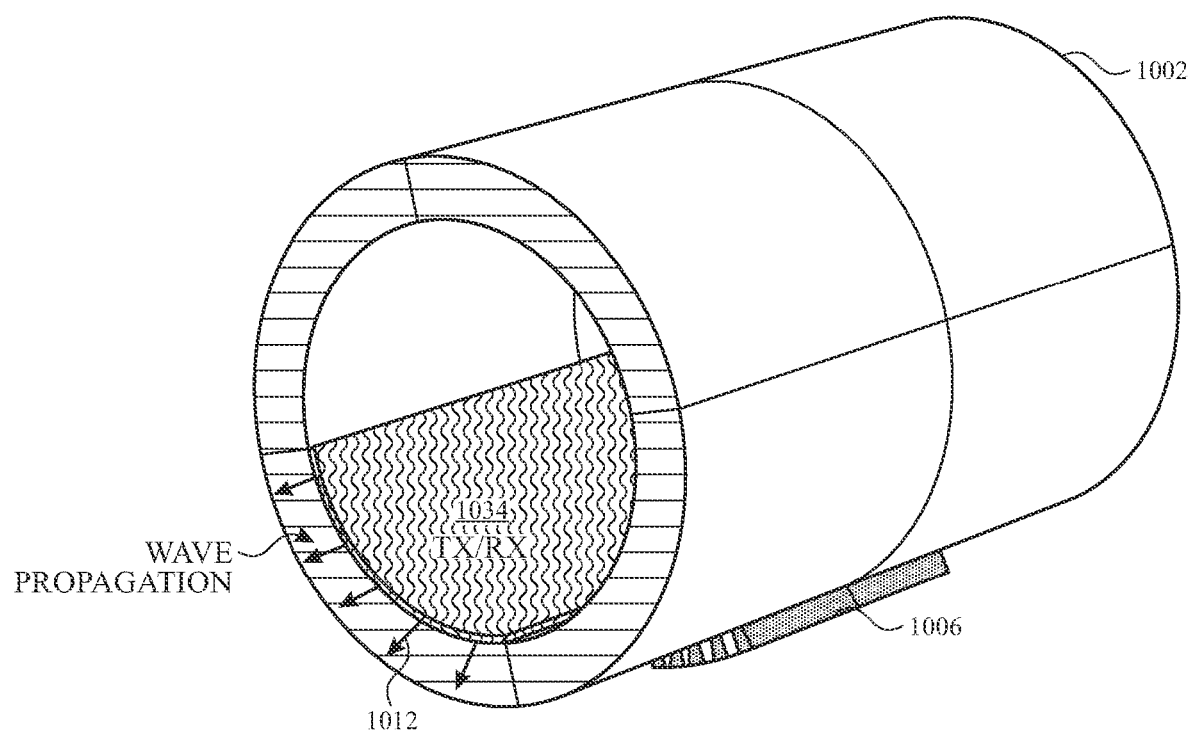
FIG. 10 illustrates a cylinder with radial ultrasonic touch sensing according to examples of the disclosure.

FIG. 10 illustrates cylinder 1002 with radial ultrasonic touch sensing according to examples of the disclosure. In the example of FIG. 10, a two-dimensional multi-pixel array 1034 of ultrasonic transducers can be formed on a substrate (e.g., polyvinylidene fluoride (PVDF)) and laminated at least partially circumferentially and axially to the inner curvature of cylinder 1002. The transducers in array 1034 can launch ultrasonic GWs 1012 in the radial direction to detect finger 1006. Although FIG. 10 illustrates array 1034 located along only a partial circumference of cylinder 1002 along an entire axial length of the cylinder, in other examples the transducers can extend entirely around a circumference of the cylinder, can extend only partially along the axial length of the cylinder, and can be located away from the edge of the cylinder. If finger 1006 is present along the outer surface of cylinder 1002, some of the ultrasonic wave energy is absorbed by wave propagation discontinuities caused by the finger, and less energy is reflected back to array 1034. This change in reflected energy can be detected to realize 2D touch localization.

Figure 11A:
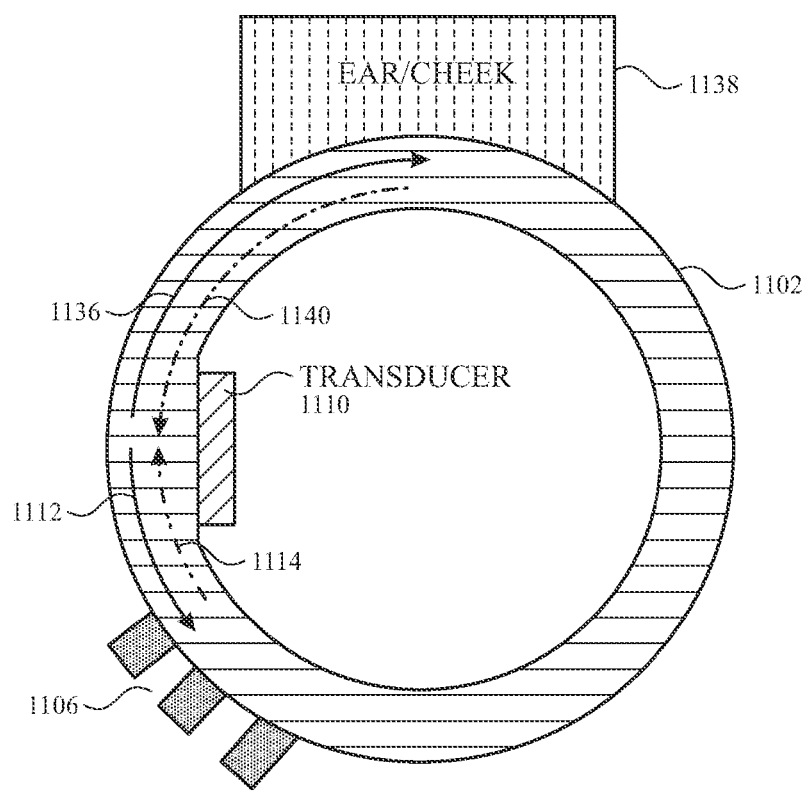
FIG. 11A illustrates an ultrasonic transducer operating in a pulse/echo or TOF configuration in the presence of a finger and also in the presence of an unintended touching object such as an ear or cheek according to examples of the disclosure.

FIG. 11A illustrates an ultrasonic transducer 1110 operating in a pulse/echo or TOF configuration in the presence of finger 1106 and also in the presence of an unintended touching object such as an ear or cheek 1138 according to examples of the disclosure. Although only one transducer 1110 is shown in the cross-sectional view of FIG. 11A, multiple transducers may be present in a one-dimensional multi-pixel array, as in FIG. 6B. In the example of FIG. 11A, transducer 1110 can transmit an ultrasonic incident GW 1112 in a counterclockwise direction. In some examples, each transducer 1110 can generate an incident GW 1112, one transducer at a time, in series. In some examples, each incident GW 1112 transmitted by a single transducer 1110 can encounter and reflect off wave propagation discontinuities caused by finger 1106, and some or all transducers in the array can receive a modified GW (reflected GW 1114) at about the same time. TOF algorithms can thereafter be applied to reflection data (if any) received at each transducer 1110 after all transducers have transmitted their GWs in series, in order to localize the finger.

However, in the example of FIG. 11A, each transducer 1110 can also transmit opposing GW 1136 in a clockwise direction, while transmitting incident GW 1112 in the counterclockwise direction. An unintended touching object 1138 such as an ear or cheek touching cylinder 1102 at the 12 o'clock position can generate a modified GW (parasitic reflection 1140) after being encountered by opposing GW 1136 that can interfere with finger touch localization, as will be described below.

Figure 11B:
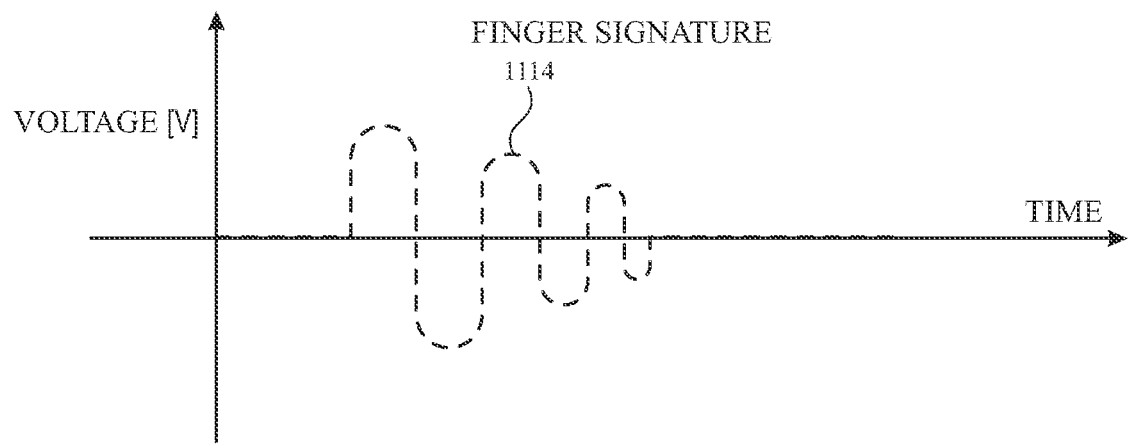
FIG. 11B illustrates a reflected GW resulting from the reflection of an incident GW off a wave propagation discontinuity caused by finger according to examples of the disclosure.
Figure 11C:
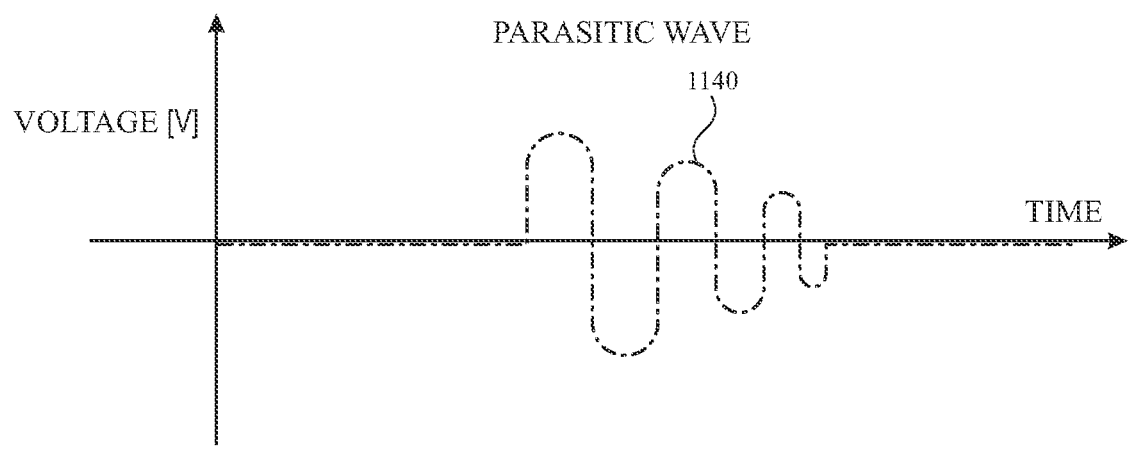
FIG. 11C illustrates a parasitic reflection resulting from the reflection of an opposing GW off a wave propagation discontinuity caused by an object such as an ear or cheek according to examples of the disclosure.
Figure 11D:
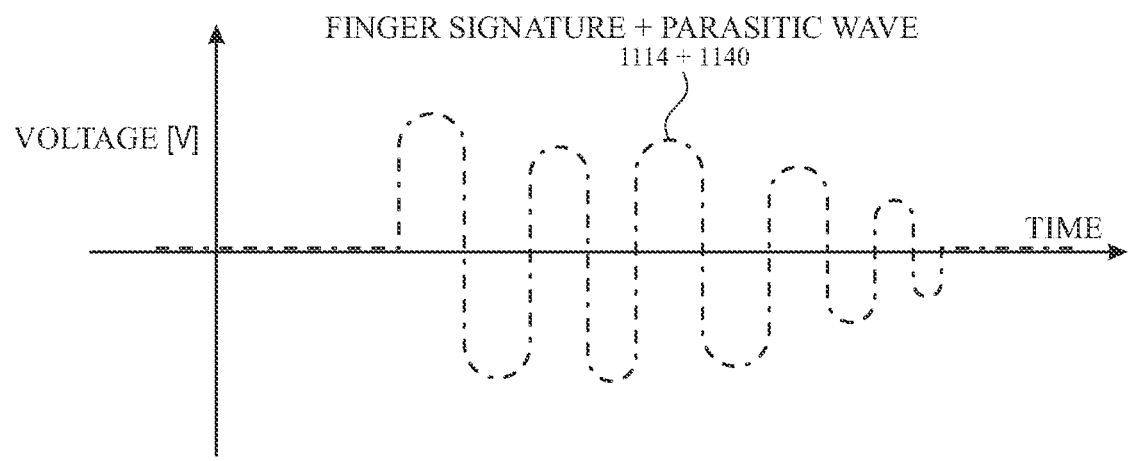
FIG. 11D illustrates a superposition of a reflected GW and a parasitic reflection according to examples of the disclosure.

FIG. 11B illustrates reflected GW 1114 resulting from the reflection of incident GW 1112 off wave propagation discontinuities caused by finger 1106 according to examples of the disclosure. FIG. 11C illustrates parasitic reflection 1140 resulting from the reflection of opposing GW 1136 off a wave propagation discontinuity caused by an object such as an ear or cheek 1138 according to examples of the disclosure. FIG. 11D illustrates a superposition of reflected GW 1114 and parasitic reflection 1140 according to examples of the disclosure. Although the examples of FIGS. 11B-11D show reflected GW 1114 being received back at transducer 1110 slightly earlier than parasitic reflection 1140 due to finger 1106 being somewhat closer to the transducer than object 1138, the superposition of reflections in FIG. 11D shows that the two reflections can be difficult to separate. Fundamentally, the rough symmetry of the location of the finger and the object with respect to the transducer location, along with the rough symmetry of the reflected GW 1114 and parasitic reflection 1140 received back at the transducers, can make it difficult or impossible to disambiguate the finger reflection from the object reflection, which can lead to errors in localization of the finger.

Figure 12A:
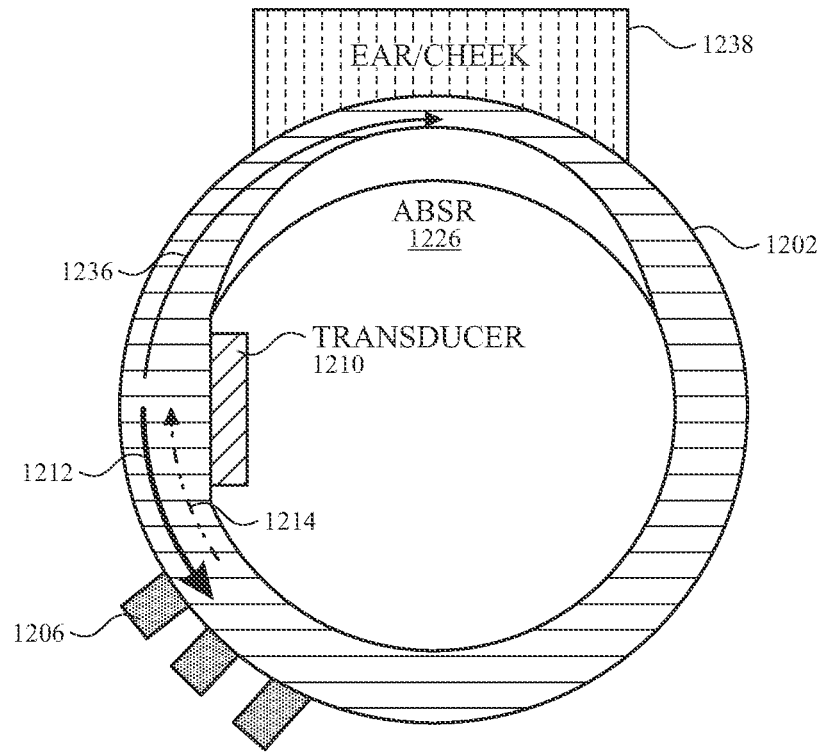
FIG. 12A illustrates an ultrasonic transducer with absorbent material at an expected location of an unintended touch and operating in a pulse/echo or TOF configuration according to examples of the disclosure.

FIG. 12A illustrates an ultrasonic transducer 1210 with absorbent material 1226 at an expected location of an unintended touch and operating in a pulse/echo or TOF configuration according to examples of the disclosure. Although only one transducer 1210 is shown in the cross-sectional view of FIG. 12A, multiple transducers may be present in a one-dimensional multi-pixel array, as in FIG. 6B. In some examples, a 0-3 tungsten-epoxy composite can be used as an absorbent. This composite can be created by mixing tungsten particles with epoxy. The epoxy type and percentage of filler can be selected such that the average acoustic impedance of the absorbent matches the impedance of cylinder material. This impedance matching can help with efficient energy transition from the cylinder to the absorbent. In addition, the tungsten particles can cause scattering of ultrasonic waves. The scattered waves can then be absorbed in the epoxy matrix. This process can make the composite material highly absorbent. In the example of FIG. 12A, transducer 1210 can transmit an ultrasonic incident GW 1212 in a counterclockwise direction, and also opposing GW 1236 in the clockwise direction. In some examples, each transducer 1210 can generate an incident GW 1212 and opposing GW 1236, one transducer at a time, in series.

Absorbent material 1226 can be selectively placed at a location where unintended touches are expected to occur (e.g., at the 12 o'clock position in the example of FIG. 12A), and/or between the transducer 1210 and the location where unintended touches are expected to occur (e.g., between the 9 o'clock and 12 o'clock positions). Absorbent material 1226 can effectively narrow the transmissive portion of cylinder 1202 at or before the location where unintended touches are expected to occur, and can be selected to absorb most of opposing GW 1236 prior to it encountering and reflecting off wave propagation discontinuities caused by object 1238. As a result, only a small parasitic reflection may be received back at transducer 1210. For each incident GW 1212 transmitted by a single transducer 1210, some or all transducers in the transducer array can receive a modified GW (reflected GW 1214) after the incident GW encounters (reflects off) wave propagation discontinuities caused by finger 1206 at about the same time. TOF algorithms can thereafter be applied to reflection data (if any) received at each transducer 1210 after all transducers have transmitted their GWs in series, in order to localize the finger.

Figure 12B:
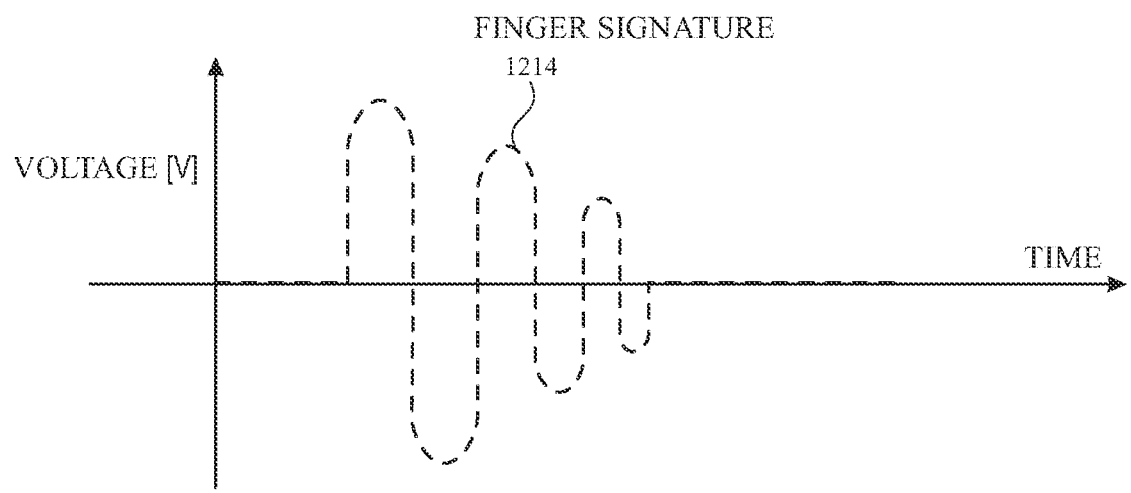
FIG. 12B illustrates a reflected GW resulting from the reflection of an incident GW off of a wave propagation discontinuity caused by a finger according to examples of the disclosure.
Figure 12C:
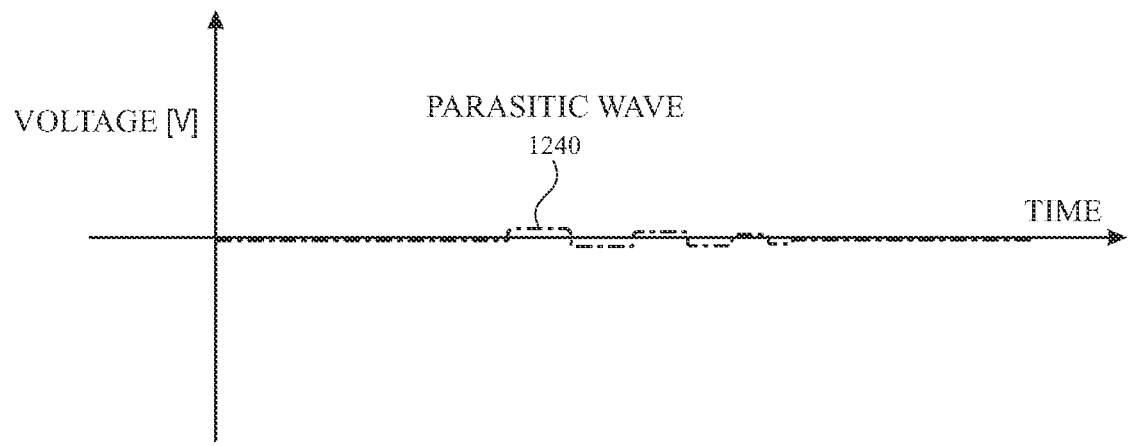
FIG. 12C illustrates a parasitic reflection resulting from the reflection of an opposing GW off a wave propagation discontinuity caused by an object such as an ear or cheek but in the presence of absorbent material according to examples of the disclosure.

FIG. 12B illustrates reflected GW 1214 resulting from the reflection of incident GW 1212 off wave propagation discontinuities caused by finger 1206 according to examples of the disclosure. FIG. 12C illustrates parasitic reflection 1240 resulting from the reflection of opposing GW 1236 off wave propagation discontinuities caused by an object such as an ear or cheek 1238 but in the presence of absorbent material 1226 according to examples of the disclosure. As shown in the example of FIG. 12C, the amplitude of parasitic reflection 1240 can be greatly reduced (compare with FIG. 11C) due to absorbent material 1226. Reduction of parasitic reflection 1240 can depend on the quality of absorbent material 1226 and the location of an unintended touch with respect to the absorbent material. In some examples, the amplitude of parasitic reflection 1240 can be reduced by about 20-30 dB. Because of the minimal parasitic reflection 1240, the superposition of reflected GW 1214 and parasitic reflection 1240 can yield a signature that is close to the reflected GW 1214, which can result in more accurate touch localization of finger 1206.

Although not shown in FIG. 12A, in other examples a pitch-catch or tomography architecture can also be employed, with an array of receivers located on the opposite side of cylinder 1202 as shown in FIG. 6D. In other examples, transducer 1210 can be replaced by a phased array of transducers, which can generate incident GW 1212 in the counterclockwise direction, with a much smaller opposing GW 1236 generated in the clockwise direction, which can further reduce parasitic reflection 1240 resulting from the reflection of opposing GW 1236 off wave propagation discontinuities caused by object 1238.

Fundamentally, by placing absorbent material 1226 at an expected location of an unintended touch, the amplitude symmetry of reflected GW 1214 and parasitic reflection 1240 can be disrupted, which can allow the parasitic reflection to be rejected (e.g., by filtering). Disambiguation of the desired reflected GW 1214 from the undesired parasitic reflection 1240 can result in more accurate touch localization.

Figure 13A:
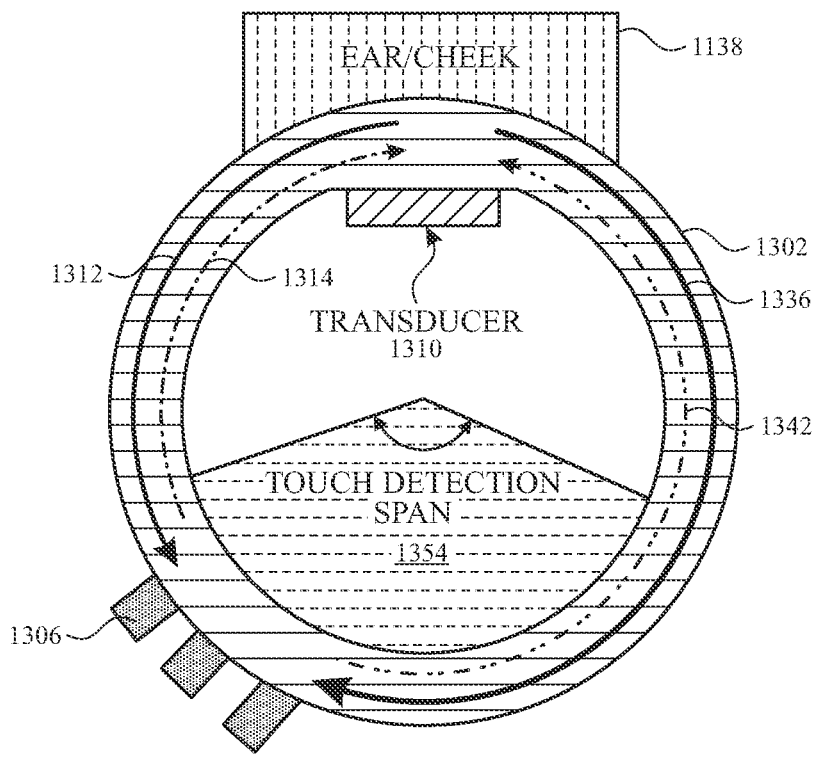
FIG. 13A illustrates an ultrasonic transducer located near an expected unintended touch location and operating in a pulse/echo or TOF configuration according to examples of the disclosure.

FIG. 13A illustrates an ultrasonic transducer 1310 located near (proximate) an expected unintended touch location and operating in a pulse/echo or TOF configuration according to examples of the disclosure. Although only one transducer 1310 is shown in the cross-sectional view of FIG. 13A, multiple transducers may be present in a one-dimensional multi-pixel array, as in FIG. 6B. In the example of FIG. 13A, transducer 1310 can transmit an ultrasonic incident GW 1312 in a counterclockwise direction, and also opposing GW 1336 in the clockwise direction. In some examples, each transducer 1310 can generate an incident GW 1312 and opposing GW 1336, one transducer at a time, in series. In the example of FIG. 13A, transducer 1310 can be placed at a location where an unintended object touch such as from an ear or cheek 1338 can be expected.

Figure 13B:
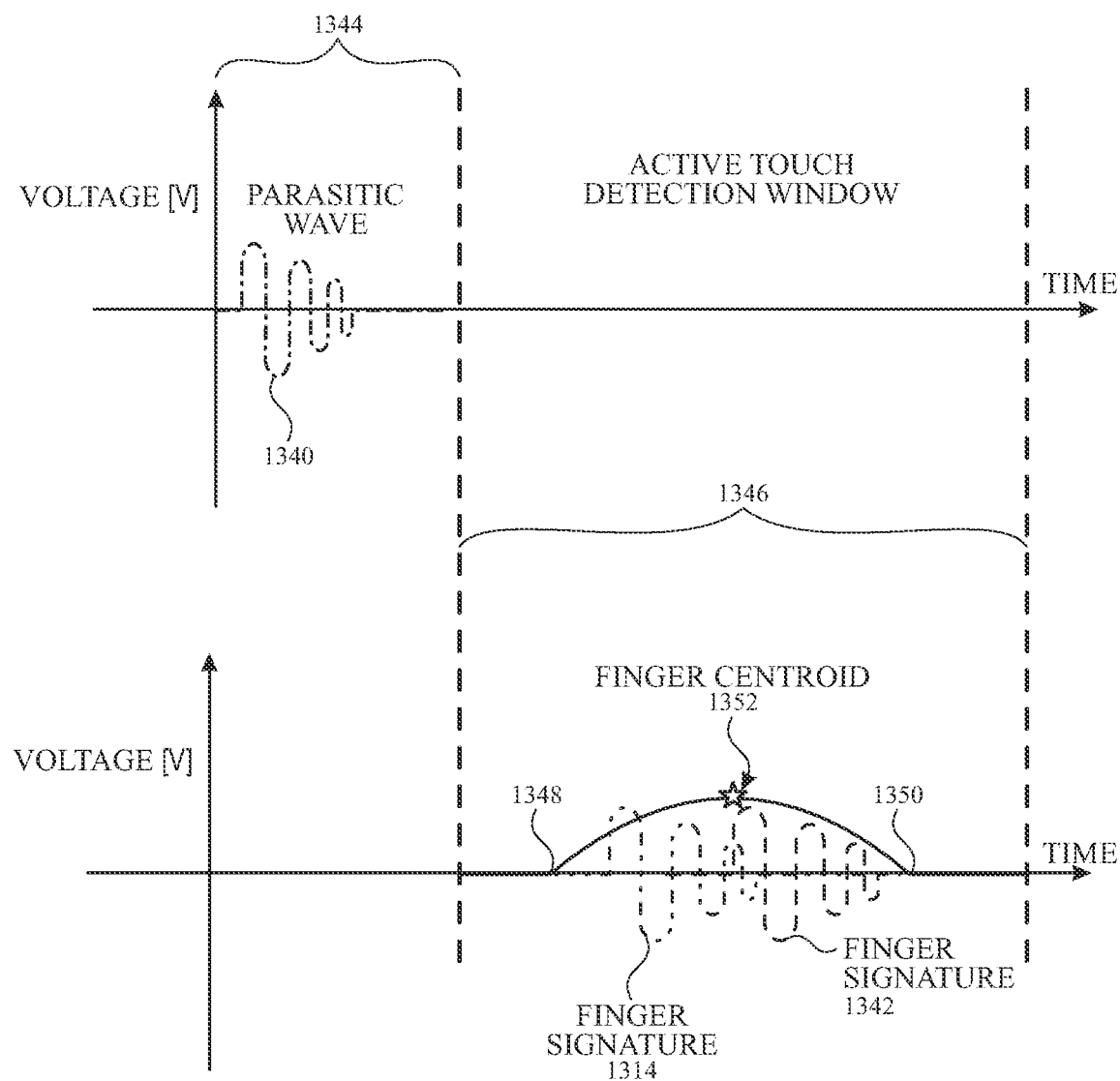
FIG. 13B illustrates a graph of parasitic reflections occurring in a touch rejection window and reflected GWs occurring in an active touch detection window according to examples of the disclosure.

FIG. 13B illustrates a graph of parasitic reflections 1340 occurring in a touch rejection window 1344 and reflected GWs 1314 and 1342 occurring in an active touch detection window 1346 according to examples of the disclosure. By placing transducer 1310 near the expected location of an unintended object touch 1338, any modified GW (parasitic reflection 1340) generated due to an incident GW encountering and reflecting off wave propagation discontinuities caused by the unintended object touch can occur in touch rejection window 1344 well before any modified GWs (reflected GWs 1314 or 1342) are received. Parasitic reflections 1340 occurring in touch rejection window 1344 can be ignored (e.g., using temporal filtering) when performing touch localization.

Referring again to FIG. 13A, incident GW 1312 and opposing GW 1336 can travel around cylinder 1302 in opposite directions until they encounter and reflect off the wave propagation discontinuity caused by finger 1306, and modified GWs (reflected GWs 1314 and 1342) are generated. Reflected GWs 1314 and 1342 can be received back at transducer 1310 within an active touch detection window 1346, well after any parasitic reflections 1340 are received within touch rejection window 1344, as shown in the lower waveform in FIG. 13B. In the example of FIG. 13B, reflected GWs 1314 and 1342 occur at different times due to incident GW 1312 travelling a shorter distance to finger 1306 than opposing GW 1336, although in other examples this need not be the case. GW reflections occurring in active touch detection window 1346 can be considered when performing touch localization. As FIG. 13B indicates, in some examples an increase in amplitude of reflected GW 1314 and reflected GW 1342 can be used to identify the start of finger 1306 from both the counterclockwise and clockwise directions (see locations 1348 and 1350, respectively). In addition, a finger centroid 1352 can also be computed from the positions 1348 and 1350.

FIG. 13A also illustrates touch detection span 1354. In some examples of the disclosure, the main touch feature can be a slider, and a particular angle such as 90-120 degrees can be established for touch detection span 1354. The active touch detection window 1346 shown in FIG. 13B can be set such that touches outside of this window are outside touch detection span 1354, and can be ignored as an invalid touch.

Although not shown in FIG. 13A, in other examples a pitch-catch or tomography architecture can also be employed, with an array of receivers located at the 9 o'clock position (for clockwise opposing GWs 1336) and at the 3 o'clock position (for counterclockwise incident GWs 1312) of cylinder 1302. In other examples, transducer 1310 can be replaced by a phased array of transducers, which can generate incident GWs 1312 and 1336 in the counterclockwise and clockwise directions, respectively, one at a time, with a much smaller opposing GWs generated in the opposite directions, which can further reduce parasitic reflections 1340 resulting from the reflection of opposing GWs off wave propagation discontinuities caused by object 1338.

Fundamentally, placement of transducer 1310 near the expected location of an unintended touch can ensure that the distance from the transducer to an unintended touch and to an intended touch are significantly different, which can disrupt the temporal symmetry of the reflected GWs 1314 and 1342 and parasitic reflection 1340, and allow the parasitic reflection to be rejected (e.g., by temporal filtering). Disambiguation of the desired reflected GWs 1314 and 1342 from the undesired parasitic reflection 1340 can result in more accurate touch localization.

Figure 14A:
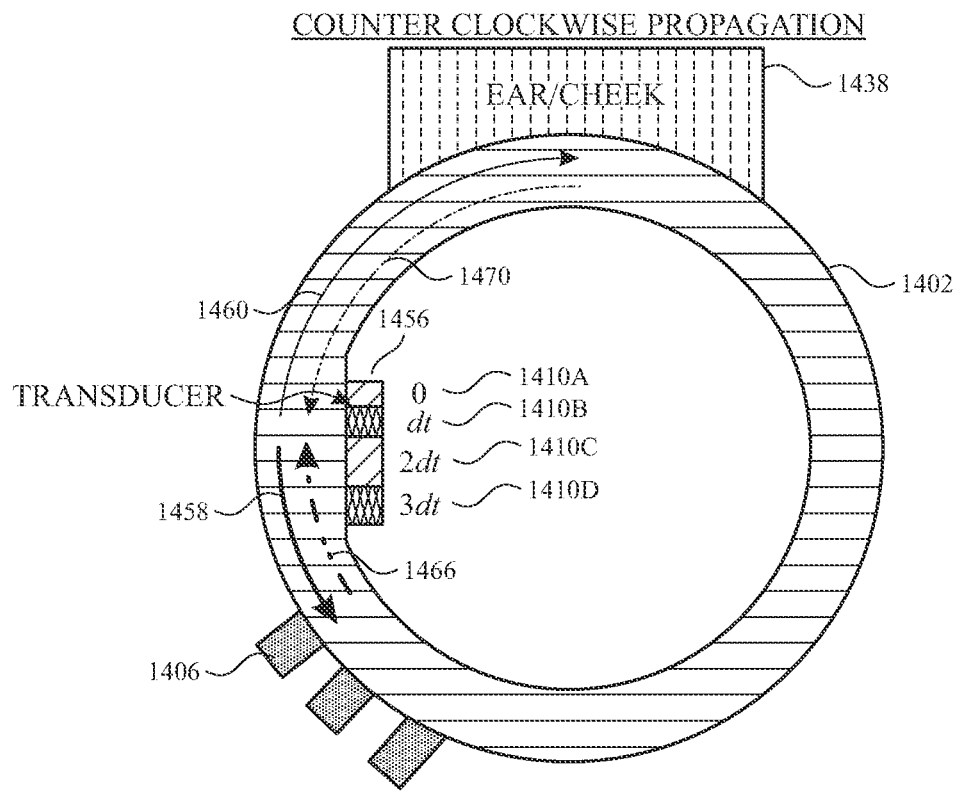
FIG. 14A illustrates an ultrasonic transducer phased array operating in a pulse/echo or TOF configuration and generating a counterclockwise incident GW according to examples of the disclosure.

FIG. 14A illustrates an ultrasonic transducer phased array 1456 operating in a pulse/echo or TOF configuration and generating a counterclockwise incident GW 1458 according to examples of the disclosure. Although only one partially circumferential phased array 1456 is shown in the cross-sectional view of FIG. 14A, multiple transducer phased arrays may be present in a two-dimensional (circumferential and axial) multi-pixel phased array. In the example of FIG. 14A, phased array 1456 can include multiple transducers 1410a-1410d (labeled from top to bottom in the orientation of FIG. 14A). Transducer 1410a can launch a pulse at time 0, transducer 1410b can launch a pulse at time dt, transducer 1410c can launch a pulse at time 2dt, and transducer 1410d can launch a pulse at time 3dt. As a result, incident GW 1458 can be generated in the counterclockwise direction, with a much smaller opposing GW 1460 generated in the clockwise direction.

Figure 14B:
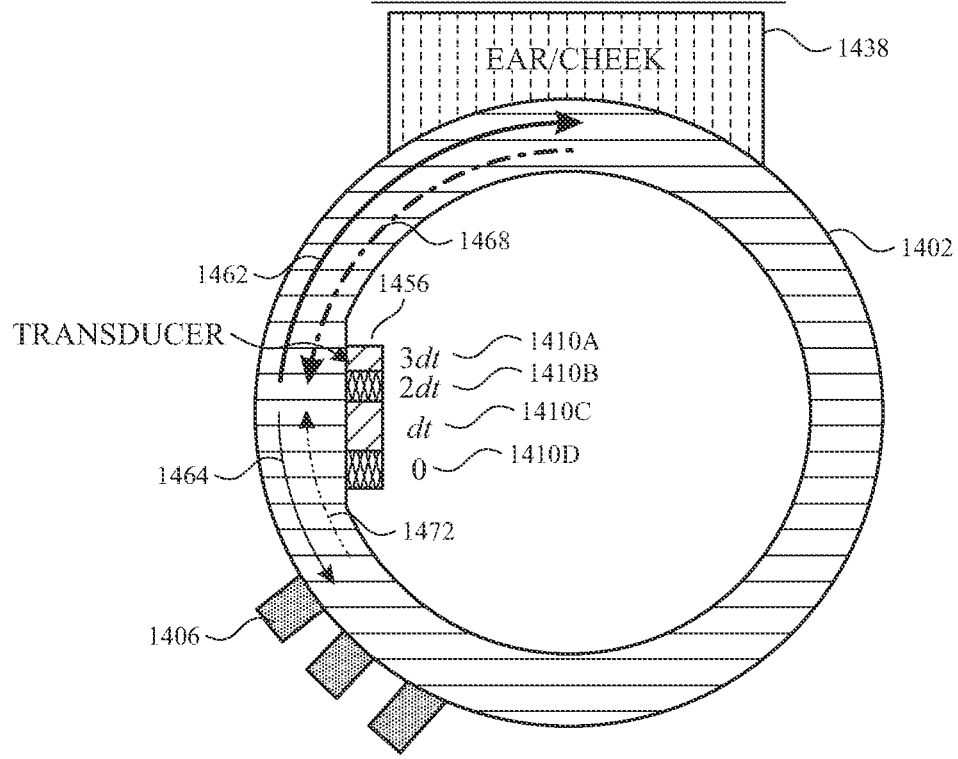
FIG. 14B illustrates an ultrasonic transducer phased array operating in a pulse/echo or TOF configuration and generating a clockwise incident GW according to examples of the disclosure.

FIG. 14B illustrates an ultrasonic transducer phased array 1456 operating in a pulse/echo or TOF configuration and generating a clockwise incident GW 1462 according to examples of the disclosure. After incident GW 1458 is generated in the counterclockwise direction as shown in FIG. 14A, transducer 1410d can launch a pulse at time 0, transducer 1410c can launch a pulse at time dt, transducer 1410b can launch a pulse at time 2dt, and transducer 1410a can launch a pulse at time 3dt. As a result, incident GW 1462 can be generated in the clockwise direction, with a much smaller opposing GW 1464 generated in the counterclockwise direction. Generating clockwise incident GW 1462 as shown in FIG. 14B can help to disambiguate a weak touch (e.g., a light touch) by finger 1406 from an unintended touch by object 1438. For example, in the example of FIG. 14A, counterclockwise incident GW 1458 may produce a weak reflected GW 1466 when only a weak (light) intended touch (or possibly no touch) is present. In addition, opposing GW 1460 (though having much lower energy than counterclockwise incident GW 1458) can produce a weak reflected GW 1470 when an unintended touch is present. Without more, it may be difficult to determine whether a weak reflection received at transducer phased array 1456 is from a weak intended touch or from an unintended object. However, if clockwise incident GW 1462 is thereafter generated as shown in FIG. 14B, the presence of a strong parasitic reflection 1468 can be used to confirm that an unintended object (instead of a weak intended touch) is present.

In some examples, each array 1456 can generate an incident GW 1458 or 1462, one transducer at a time, in series. In some examples, for each incident GW 1458 or 1462 transmitted by a single array 1456, one or more of the transducers in the transducer array can receive a modified GW (reflected GW 1466 from finger 1406 or parasitic reflection 1468 from object 1438) at about the same time. In some examples, the same transducer (pixel) that generated the incident wave can receive the reflected wave. In other examples, a plurality or all of the transducers in the array can receive the reflected wave. Although a plurality or all of the transducers in array 1456 may receive the reflected wave, the reflected wave amplitude will often have a maximum amplitude at the same transducer (pixel) that transmitted the incident wave. The amplitude of reflected waves can drop significantly as the receive pixel gets farther away from the transmit pixel. TOF algorithms can thereafter be applied to reflection data (if any) received at each transducer 1410a-1410d after all phased arrays have transmitted their GWs in series, in order to localize the finger.

Figure 14C:
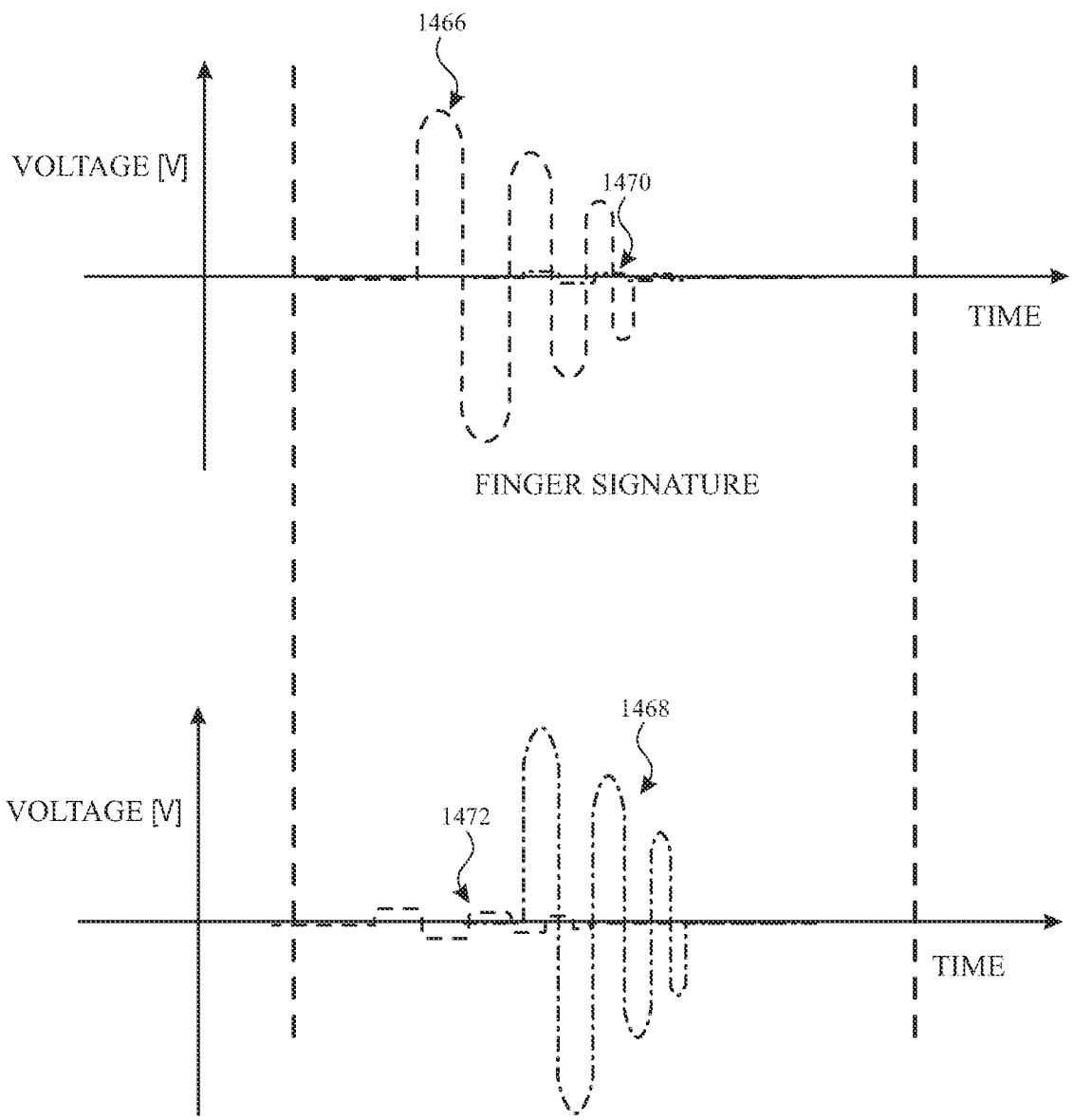
FIG. 14C illustrates a finger signature corresponding to a reflected GW and an object (e.g., ear/cheek) signature corresponding to a parasitic reflection generated by the ultrasonic transducer phased array of FIGS. 14A and 14B according to examples of the disclosure.

FIG. 14C illustrates a finger signature corresponding to reflected GW 1466 and an object (e.g., ear/cheek) signature corresponding to parasitic reflection 1468 generated by the ultrasonic transducer phased array 1456 of FIGS. 14A and 14B according to examples of the disclosure. In the example upper graph of FIG. 14C, which corresponds to FIG. 14A, a modified GW (parasitic reflection 1470) caused by small opposing GW 1460 encountering and reflecting off wave propagation discontinuities caused by object 1438 can have a minimal amplitude, while the modified GW (reflected GW 1466) caused by incident GW 1458 encountering and reflecting off wave propagation discontinuities caused by finger 1406 can have a comparatively larger amplitude. In the example lower graph of FIG. 14C, which corresponds to FIG. 14B, a modified GW (parasitic reflection 1468) caused by incident GW 1462 encountering and reflecting off wave propagation discontinuities caused by object 1438 can have a comparatively larger amplitude, while the modified GW (reflected GW 1472) caused by small opposing GW 1464 encountering and reflecting off wave propagation discontinuities caused by finger 1406 can have a comparatively smaller amplitude.

As the top graph of FIG. 14C illustrates, the small opposing GW 1460 produced by the phased array in FIG. 14A can result in minimal parasitic reflections 1470, which can make it easier to detect reflected GW 1466 and determine finger localization while ignoring the effect of parasitic reflections (using filtering or time windowing, for example). Similarly, as the bottom graph of FIG. 14C illustrates, the small opposing GW 1464 produced by the phased array can result in minimal reflected GWs 1472, which can make it easier to detect parasitic reflection 1468 while ignoring reflected GW 1472 (using filtering or time windowing, for example).

Fundamentally, by utilizing an ultrasonic phased array to first transmit GWs primarily in the counterclockwise direction (FIG. 14A) and then transmit GWs primarily in the clockwise direction (FIG. 14B), the symmetry of a single transducer transmitting GWs in both directions at the same time and the additional amplitude symmetry of receiving reflected GWs and parasitic reflections with similar amplitudes can be disrupted, which can allow the parasitic reflections to be rejected (e.g., by filtering). In essence, the ability to transmit GWs primarily in a single direction, and in opposite directions at different times, provides for separate investigations of touching objects near the bottom of cylinder 1402 (with respect to the orientation of FIGS. 14A and 14B) and near the top of the cylinder. Disambiguation of desired reflected GWs caused by those touching objects from undesired parasitic reflections can result in more accurate intended touch localization.

Although not shown in FIGS. 14A and 14B, in other examples a pitch-catch or tomography architecture can also be employed, with an array of receivers located on the opposite side of cylinder 1402 from array 1456 as shown in FIG. 6D.

Figure 15A:
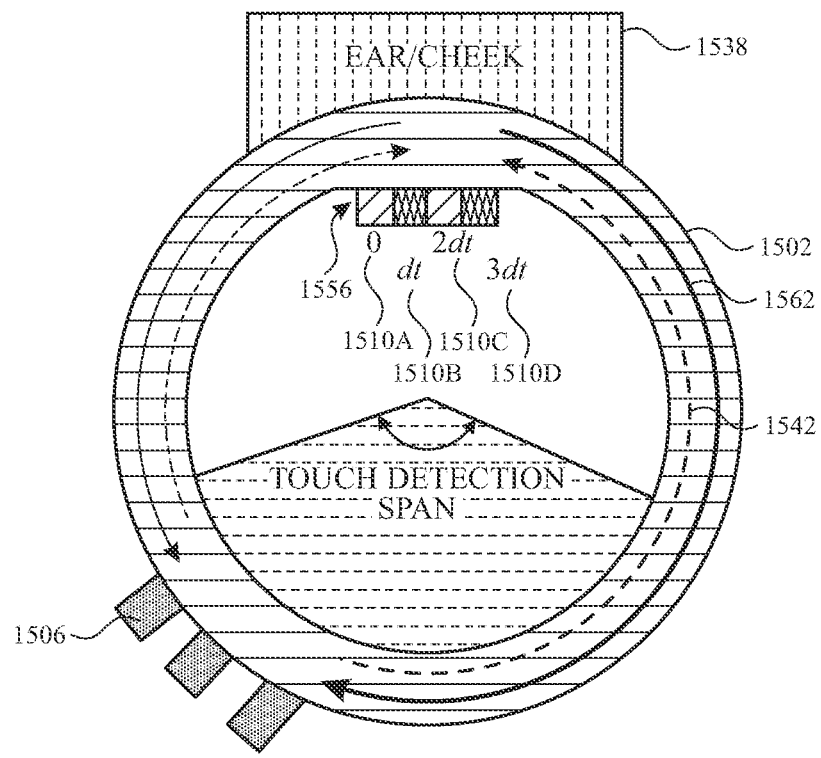
FIGS. 15A-15D illustrate a combined approach of placing ultrasonic phased arrays at the expected location of unintended touches according to examples of the disclosure.

FIGS. 15A-15D illustrate a combined approach of placing ultrasonic phased arrays at the expected location of unintended touches according to examples of the disclosure. FIG. 15A illustrates an ultrasonic phased array 1556 formed from transducers 1510a-1510d operating in a pulse/echo or TOF configuration in the presence of finger 1506 and also in the presence of an unintended touching object such as an ear or cheek 1538 according to examples of the disclosure. Although only one phased array 1556 is shown in the cross-sectional view of FIG. 15A, multiple phased arrays may be present in a two-dimensional multi-pixel array. In the example of FIG. 15A, phased array 1556 can transmit an ultrasonic incident GW 1562 in a clockwise direction. In some examples, each phased array 1556 can generate an incident GW 1562, one transducer at a time, in series.

In the example of FIG. 15A, phased array 1556 can be placed at a location where an unintended object touch such as from an ear or cheek 1538 can be expected. By placing phased array 1556 near the expected location of an unintended object touch, any parasitic reflections 1540 off wave propagation discontinuities caused by the unintended object touch can occur in touch rejection window 1544 well before any reflected GW 1542 is received, as shown in the upper waveform in the example of FIG. 15C. Parasitic reflections 1540 occurring in touch rejection window 1544 can be ignored when performing touch localization.

Figure 15B:
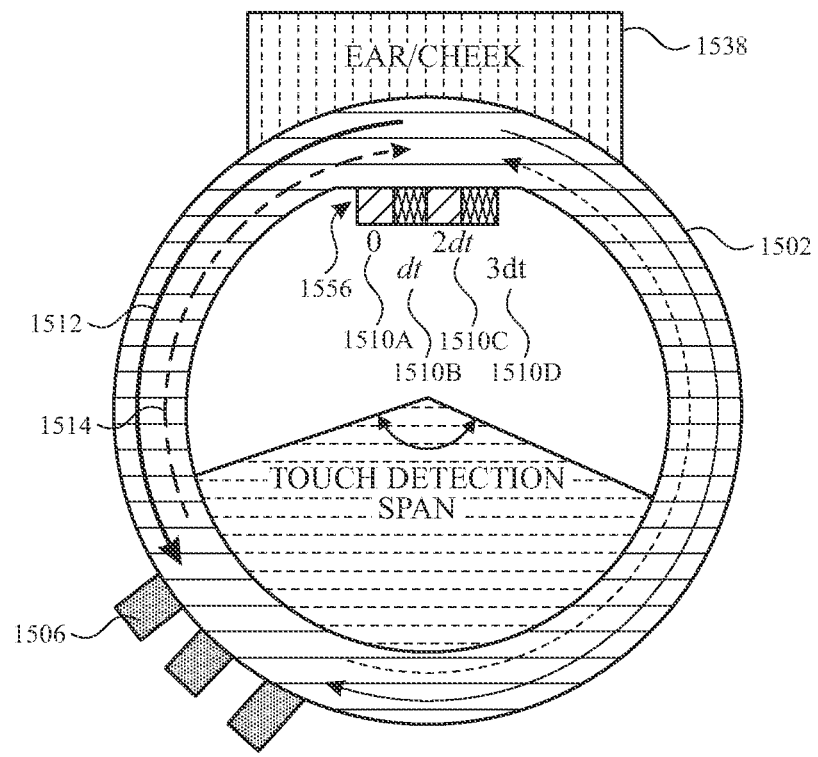

Similarly, in the example of FIG. 15B, phased array 1556 can transmit an ultrasonic incident GW 1512 in a counter-clockwise direction. By placing phased array 1556 near the expected location of an unintended object touch, any parasitic reflections 1540 off wave propagation discontinuities caused by the unintended object touch can occur in touch rejection window 1544 well before any reflected GW 1514 is received, as shown in the lower waveform in the example of FIG. 15C. Parasitic reflections 1540 occurring in touch rejection window 1544 can be ignored when performing touch localization.

Figure 15C:
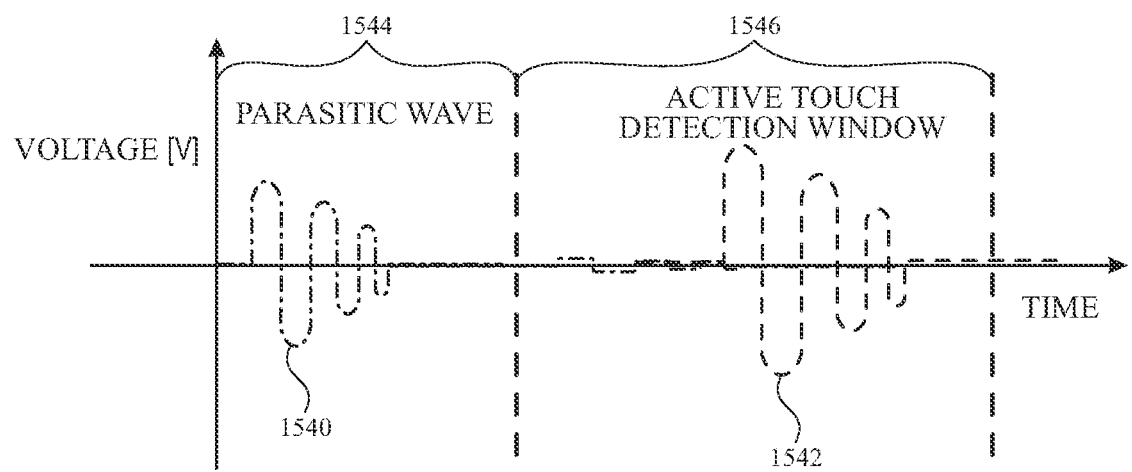
Figure 15C:
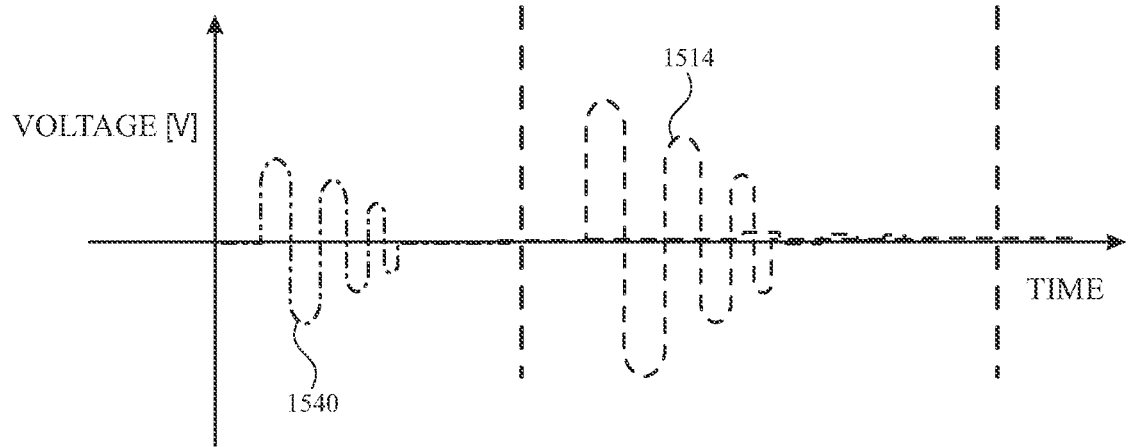
Figure 15D:
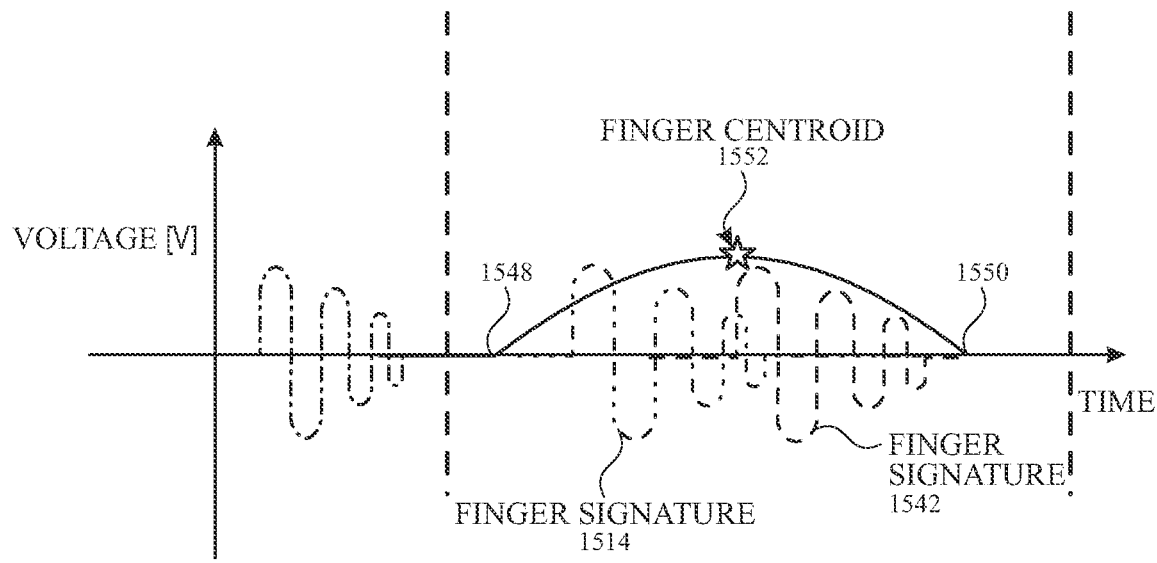

Referring again to FIGS. 15A and 15B, incident GW 1562 and incident GW 1512 can travel around cylinder 1502 in opposite directions until they reflect off the wave propagation discontinuity caused by finger 1506, and reflected GWs 1542 and 1514 are generated, respectively. Reflected GWs 1542 and 1514 can be received back at phased array 1556 within an active touch detection window 1546, well after any parasitic reflections 1540 are received within touch rejection window 1544, as shown in FIG. 15C. In the example of FIG. 15C, reflected GWs 1542 and 1514 occur at different times due to incident GW 1562 travelling a longer distance to finger 1506 than incident GW 1512, although in other examples this need not be the case. GW reflections occurring in active touch detection window 1546 can be considered when performing touch localization. As FIG. 15D indicates, in some examples an increase in amplitude of reflected GW 1514 and reflected GW 1542 can be used to identify the start of finger 1506 from both the counterclockwise and clockwise directions (see locations 1548 and 1550, respectively). In addition, a finger centroid 1552 can also be computed from the positions 1548 and 1550.

Fundamentally, by utilizing an ultrasonic phased array to first transmit GWs primarily in the clockwise direction (FIG. 15A) and then transmit GWs primarily in the counterclockwise direction (FIG. 15B), the symmetry of a single transducer transmitting GWs in both directions at the same time and the additional amplitude symmetry of receiving reflected GWs and parasitic reflections with similar amplitudes can be disrupted, which can allow the parasitic reflections to be rejected (e.g., by filtering). In addition, placement of the phased array 1556 near the expected location of an unintended touch can ensure that the distance from the phased array to an unintended touch and to an intended touch are significantly different, which can disrupt the temporal symmetry of the reflected and parasitic GWs and allow the parasitic reflection to be rejected (e.g., by temporal filtering).

Although not shown in FIGS. 15A and 15B, in other examples a pitch-catch or tomography architecture can also be employed, with an array of receivers located at the 9 o'clock position (for clockwise incident GWs 1562) and at the 3 o'clock position (for counterclockwise incident GWs 1512) of cylinder 1502.

Figure 16A:
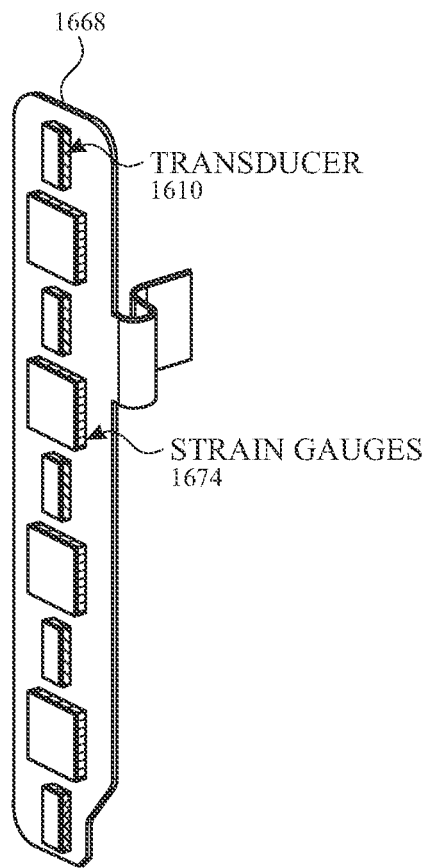
FIG. 16A illustrates an implementation wherein ultrasonic transducers (or phased arrays) can be co-located with force sensors in the same module according to examples of the disclosure.

FIG. 16A illustrates an implementation wherein ultrasonic transducers 1610 (or phased arrays) can be co-located with force sensors 1674 in the same module 1668 according to examples of the disclosure. In the example of FIG. 16A, piezo ultrasonic transducers 1610 can alternate with strain gauge force sensors 1674 in module 1668, although in other examples different types of ultrasonic transducers and force sensors can be employed. In some examples, transducers 1610 can be independently driven using time division multiplexing (TDM), but in other examples they can be driven simultaneously. The wider spacing of transducers 1610 shown in FIG. 16A (as compared to FIG. 6B, for example) can result in lower touch localization (resolution), but in some examples this lower resolution can be mitigated using triangulation and TOF data from multiple transducers, which can result in a reduction in the number of transducers. In other examples, more transducers 1610 can be employed, which can require less algorithmic complexity but greater expense and integration challenges.

Figure 16B:
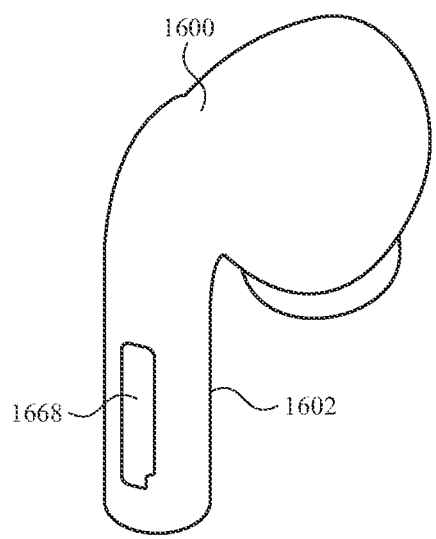
FIG. 16B illustrates an earbud with an integrated ultrasonic touch and force sensing module located within a cylinder according to examples of the disclosure.

FIG. 16B illustrates an earbud 1600 with an integrated ultrasonic touch and force sensing module 1668 located within cylinder 1602 according to examples of the disclosure. In the example of FIG. 16B, module 1668 can be located in an area selected to be easily accessible to a user yet away from expected locations of unintended touches, while avoiding sensitive electronics such as an antenna.

Therefore, according to the above, some examples of the disclosure are directed to a touch sensing device comprising a touch surface including a first location configured for producing a first wave propagation discontinuity at the touch surface when a first touch is received at the first location, and a second location configured for producing a second wave propagation discontinuity at the touch surface when a second touch is received at the second location; and one or more ultrasonic transducers coupled to the touch surface at a third location and configured to transmit first and second ultrasonic guided waves; wherein the one or more ultrasonic transducers are further configured, and the first, second and third locations are spatially arranged along the touch surface, such that when the first ultrasonic guided wave is transmitted and encounters the first wave propagation discontinuity, a first modified guided wave having a first characteristic is generated and received back at the one or more ultrasonic transducers for use in touch localization, and when the second ultrasonic guided wave is transmitted and encounters the second wave propagation discontinuity, a second modified guided wave having a second characteristic is generated and received back at the one or more ultrasonic transducers for use in touch localization. Additionally or alternatively to one or more of the examples disclosed above, in some examples the first modified guided wave is a first reflected guided wave generated when the first ultrasonic guided wave reflects off the first wave propagation discontinuity, and the second modified guided wave is a second reflected guided wave generated when the second ultrasonic guided wave reflects off the second wave propagation discontinuity. Additionally or alternatively to one or more of the examples disclosed above, in some examples the first modified guided wave is a first unabsorbed guided wave generated when the first ultrasonic guided wave passes through the first wave propagation discontinuity. Additionally or alternatively to one or more of the examples disclosed above, in some examples the one or more ultrasonic transducers are configured as a phased array for transmitting the first ultrasonic guided wave with a first amplitude and transmitting the second ultrasonic guided wave with a second amplitude less than the first amplitude. Additionally or alternatively to one or more of the examples disclosed above, in some examples the first characteristic is a first amplitude of the first modified guided wave and the second characteristic is a second amplitude of the second modified guided wave, the touch surface including an absorbent material configured for reducing the second amplitude as compared to the first amplitude. Additionally or alternatively to one or more of the examples disclosed above, in some examples the absorbent material is located at the second location. Additionally or alternatively to one or more of the examples disclosed above, in some examples the one or more ultrasonic transducers are configured as a phased array for transmitting the first ultrasonic guided wave with a first amplitude and transmitting the second ultrasonic guided wave with a second amplitude less than the first amplitude. Additionally or alternatively to one or more of the examples disclosed above, in some examples the first characteristic is a first time period and the second characteristic is a second time period that occurs prior to the first time period, and wherein the third location is proximate to the second location. Additionally or alternatively to one or more of the examples disclosed above, in some examples the one or more ultrasonic transducers are configured as a phased array for transmitting the first ultrasonic guided wave with a first amplitude and transmitting the second ultrasonic guided wave with a second amplitude less than the first amplitude. Additionally or alternatively to one or more of the examples disclosed above, in some examples during a first time period the phased array is configured for transmitting the first ultrasonic guided wave in a first direction, and transmitting the second ultrasonic guided wave in a second direction opposite the first direction at a same time as the transmission of the first ultrasonic guided wave. Additionally or alternatively to one or more of the examples disclosed above, in some examples during a second time period following the first time period, the phased array is configured for transmitting a third ultrasonic guided wave with a third amplitude in the second direction, and transmitting a fourth ultrasonic guided wave with a fourth amplitude less than the third amplitude in the first direction at the same time as the transmission of the third ultrasonic guided wave.

Some examples of the disclosure are directed to a method for touch sensing, comprising identifying a first location on a touch surface for producing a first wave propagation discontinuity when a first touch is received at the first location; identifying a second location on the touch surface for producing a second wave propagation discontinuity when a second touch is received at the second location; transmitting first and second ultrasonic guided waves from a third location on the touch surface; when the first ultrasonic guided wave encounters the first wave propagation discontinuity, generating a first modified guided wave having a first characteristic; when the second ultrasonic guided wave encounters the second wave propagation discontinuity, generating a second modified guided wave having a second characteristic; and utilizing the first and second modified guided waves for touch localization. Additionally or alternatively to one or more of the examples disclosed above, in some examples the method further comprises utilizing pulse-echo ultrasonic touch sensing wherein the first modified guided wave is a first reflected guided wave generated when the first ultrasonic guided wave reflects off the first wave propagation discontinuity, and the second modified guided wave is a second reflected guided wave generated when the second ultrasonic guided wave reflects off the second wave propagation discontinuity. Additionally or alternatively to one or more of the examples disclosed above, in some examples the method further comprises utilizing pitch-catch ultrasonic touch sensing wherein the first modified guided wave is a first unabsorbed guided wave generated when the first ultrasonic guided wave passes through the first wave propagation discontinuity. Additionally or alternatively to one or more of the examples disclosed above, in some examples the method further comprises transmitting the first ultrasonic guided wave with a first amplitude and transmitting the second ultrasonic guided wave with a second amplitude less than the first amplitude. Additionally or alternatively to one or more of the examples disclosed above, in some examples the first characteristic is a first amplitude of the first modified guided wave and the second characteristic is a second amplitude of the second modified guided wave, and the method comprises reducing the second amplitude as compared to the first amplitude by absorbing energy of the second modified guided wave. Additionally or alternatively to one or more of the examples disclosed above, in some examples the method further comprises absorbing the energy of the second modified guided wave at the second location. Additionally or alternatively to one or more of the examples disclosed above, in some examples the method further comprises transmitting the first ultrasonic guided wave with a first amplitude and transmitting the second ultrasonic guided wave with a second amplitude less than the first amplitude. Additionally or alternatively to one or more of the examples disclosed above, in some examples the first characteristic is a first time period and the second characteristic is a second time period that occurs prior to the first time period, and wherein the third location is proximate to the second location. Additionally or alternatively to one or more of the examples disclosed above, in some examples the method further comprises transmitting the first ultrasonic guided wave with a first amplitude and transmitting the second ultrasonic guided wave with a second amplitude less than the first amplitude. Additionally or alternatively to one or more of the examples disclosed above, in some examples the method further comprises transmitting the first ultrasonic guided wave in a first direction during a first time period, and transmitting the second ultrasonic guided wave in a second direction opposite the first direction at a same time as the transmission of the first ultrasonic guided wave. Additionally or alternatively to one or more of the examples disclosed above, in some examples the method further comprises, during a second time period following the first time period, transmitting a third ultrasonic guided wave with a third amplitude in the second direction, and transmitting a fourth ultrasonic guided wave with a fourth amplitude less than the third amplitude in the first direction at the same time as the transmission of the third ultrasonic guided wave.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

What is claimed is:
1. A touch sensing device, comprising:
   a touch surface having a closed-figure shape including a first location on an outer surface of the touch surface configured for producing a first wave propagation discontinuity at the touch surface when a first touch is received at the first location, and a second location on the outer surface of the touch surface configured for producing a second wave propagation discontinuity at the touch surface when a second touch is received at the second location; and
   one or more ultrasonic transducers coupled to the touch surface at a third location on an inner surface of the touch surface and configured to transmit first and second ultrasonic guided waves;
   wherein the one or more ultrasonic transducers are further configured, and the first, second and third locations are spatially arranged along the touch surface, such that
      when the first ultrasonic guided wave is transmitted and encounters the first wave propagation discontinuity, a first modified guided wave having a first characteristic is generated and received back at the one or more ultrasonic transducers for use in touch localization, and
      when the second ultrasonic guided wave is transmitted and encounters the second wave propagation discontinuity, a second modified guided wave having a second characteristic is generated and received back at the one or more ultrasonic transducers for use in touch localization.

2. The touch sensing device of claim 1, wherein the first modified guided wave is a first reflected guided wave generated when the first ultrasonic guided wave reflects off the first wave propagation discontinuity, and the second modified guided wave is a second reflected guided wave generated when the second ultrasonic guided wave reflects off the second wave propagation discontinuity.

3. The touch sensing device of claim 1, wherein the first modified guided wave is a first unabsorbed guided wave generated when the first ultrasonic guided wave passes through the first wave propagation discontinuity.

4. The touch sensing device of claim 1, wherein the one or more ultrasonic transducers are configured as a phased array for transmitting the first ultrasonic guided wave with a first amplitude and transmitting the second ultrasonic guided wave with a second amplitude less than the first amplitude.

5. The touch sensing device of claim 1, wherein the first characteristic is a first amplitude of the first modified guided wave and the second characteristic is a second amplitude of the second modified guided wave, the touch surface including an absorbent material configured for reducing the second amplitude as compared to the first amplitude.

6. The touch sensing device of claim 5, wherein the absorbent material is located at the second location.

7. The touch sensing device of claim 5, wherein the one or more ultrasonic transducers are configured as a phased array for transmitting the first ultrasonic guided wave with a first amplitude and transmitting the second ultrasonic guided wave with a second amplitude less than the first amplitude.

8. The touch sensing device of claim 1, wherein the first characteristic is a first time period and the second characteristic is a second time period that occurs prior to the first time period, and wherein the third location is proximate to the second location.

9. The touch sensing device of claim 8, wherein the one or more ultrasonic transducers are configured as a phased array for transmitting the first ultrasonic guided wave with a first amplitude and transmitting the second ultrasonic guided wave with a second amplitude less than the first amplitude.

10. The touch sensing device of claim 4, wherein during a first time period the phased array is configured for transmitting the first ultrasonic guided wave in a first direction, and transmitting the second ultrasonic guided wave in a second direction opposite the first direction at a same time as the transmission of the first ultrasonic guided wave.

11. The touch sensing device of claim 10, wherein during a second time period following the first time period, the phased array is configured for transmitting a third ultrasonic guided wave with a third amplitude in the second direction, and transmitting a fourth ultrasonic guided wave with a fourth amplitude less than the third amplitude in the first direction at the same time as the transmission of the third ultrasonic guided wave.

12. A method for touch sensing, comprising:
- identifying a first location on a touch surface having a closed-figure shape for producing a first wave propagation discontinuity when a first touch is received at the first location on an outer surface of the touch surface;
- identifying a second location on the outer surface of the touch surface for producing a second wave propagation discontinuity when a second touch is received at the second location;
- transmitting first and second ultrasonic guided waves from a third location on an inner surface of the touch surface;
- when the first ultrasonic guided wave encounters the first wave propagation discontinuity, generating a first modified guided wave having a first characteristic;
- when the second ultrasonic guided wave encounters the second wave propagation discontinuity, generating a second modified guided wave having a second characteristic; and
- utilizing the first and second modified guided waves for touch localization.

13. The method of claim 12, further comprising utilizing pulse-echo ultrasonic touch sensing wherein the first modified guided wave is a first reflected guided wave generated when the first ultrasonic guided wave reflects off the first wave propagation discontinuity, and the second modified guided wave is a second reflected guided wave generated when the second ultrasonic guided wave reflects off the second wave propagation discontinuity.

14. The method of claim 12, further comprising utilizing pitch-catch ultrasonic touch sensing wherein the first modified guided wave is a first unabsorbed guided wave generated when the first ultrasonic guided wave passes through the first wave propagation discontinuity.

15. The method of claim 12, further comprising transmitting the first ultrasonic guided wave with a first amplitude and transmitting the second ultrasonic guided wave with a second amplitude less than the first amplitude.

16. The method of claim 12, wherein the first characteristic is a first amplitude of the first modified guided wave and the second characteristic is a second amplitude of the second modified guided wave, and the method comprises reducing the second amplitude as compared to the first amplitude by absorbing energy of the second modified guided wave.

17. The method of claim 16, further comprising absorbing the energy of the second modified guided wave at the second location.

18. The method of claim 16, further comprising transmitting the first ultrasonic guided wave with a first amplitude and transmitting the second ultrasonic guided wave with a second amplitude less than the first amplitude.

19. The method of claim 12, wherein the first characteristic is a first time period and the second characteristic is a second time period that occurs prior to the first time period, and wherein the third location is proximate to the second location.

20. The method of claim 19, further comprising transmitting the first ultrasonic guided wave with a first amplitude and transmitting the second ultrasonic guided wave with a second amplitude less than the first amplitude.

21. The method of claim 15, further comprising transmitting the first ultrasonic guided wave in a first direction during a first time period, and transmitting the second ultrasonic guided wave in a second direction opposite the first direction at a same time as the transmission of the first ultrasonic guided wave.

22. The method of claim 21, further comprising:
- during a second time period following the first time period, transmitting a third ultrasonic guided wave with a third amplitude in the second direction, and transmitting a fourth ultrasonic guided wave with a fourth amplitude less than the third amplitude in the first direction at the same time as the transmission of the third ultrasonic guided wave.

* * * * *